(12) United States Patent
Uchida et al.

(10) Patent No.: US 11,448,894 B2
(45) Date of Patent: Sep. 20, 2022

(54) IMAGING DEVICE INCLUDING SHAKE CORRECTION MECHANISM, AND OPERATION METHOD AND OPERATION PROGRAM THEREOF

(71) Applicant: FUJIFILM Corporation, Tokyo (JP)

(72) Inventors: Akihiro Uchida, Saitama (JP); Koichi Tanaka, Saitama (JP); Kenkichi Hayashi, Saitama (JP); Hideo Kobayashi, Saitama (JP); Seiichi Izawa, Saitama (JP)

(73) Assignee: FUJIFILM Corporation, Tokyo (JP)

(*) Notice: Subject to any disclaimer, the term of this patent is extended or adjusted under 35 U.S.C. 154(b) by 149 days.

(21) Appl. No.: 16/829,095

(22) Filed: Mar. 25, 2020

(65) Prior Publication Data
US 2020/0225504 A1 Jul. 16, 2020

Related U.S. Application Data

(63) Continuation of application No. PCT/JP2018/035886, filed on Sep. 27, 2018.

(30) Foreign Application Priority Data

Sep. 28, 2017 (JP) .............................. JP2017-187466

(51) Int. Cl.
*G02B 27/64* (2006.01)
*H04N 5/232* (2006.01)
(Continued)

(52) U.S. Cl.
CPC ......... *G02B 27/646* (2013.01); *G02B 13/009* (2013.01); *G02B 15/14* (2013.01);
(Continued)

(58) Field of Classification Search
CPC .... G02B 27/646; G02B 13/009; G02B 15/14; G02B 15/144111; H04N 5/22541;
(Continued)

(56) References Cited

U.S. PATENT DOCUMENTS

| 9,253,403 B2* | 2/2016 | Noguchi | ............ H04N 5/23258 |
| 2005/0058442 A1* | 3/2005 | Takeda | ................ H04N 5/23287 348/E5.046 |

(Continued)

FOREIGN PATENT DOCUMENTS

| CN | 106254758 A | 12/2016 |
| JP | 2003255423 A | 9/2003 |

(Continued)

OTHER PUBLICATIONS

An Office Action; "Notice of Reasons for Refusal", mailed by the Japanese Patent Office dated Oct. 20, 2020, which corresponds to Japanese Patent Application No. 2019-545602 and is related to U.S. Appl. No. 16/829,095; with English language translation.

(Continued)

*Primary Examiner* — Padma Haliyur
(74) *Attorney, Agent, or Firm* — Studebaker & Brackett PC

(57) ABSTRACT

A lens interchangeable digital camera includes an image sensor in which a subject image is formed on an imaging surface through an imaging optical system including a zoom lens and a sensor movement type shake correction mechanism that performs a sensor movement operation of moving the image sensor in a direction to cancel a shake. A zoom operation determination unit determines whether or not a zoom operation in which the zoom lens moves is being performed. In a case where the zoom operation determination unit determines that the zoom operation is being performed, an operation deciding unit prohibits a shift opera- (Continued)

tion which is at least a part of a sensor movement operation which is allowed while the zoom operation is stopped.

11 Claims, 23 Drawing Sheets

(51) Int. Cl.
*H04N 5/225* (2006.01)
*G02B 13/00* (2006.01)
*G02B 15/14* (2006.01)
*G03B 17/14* (2021.01)

(52) U.S. Cl.
CPC .......... *G03B 17/14* (2013.01); *H04N 5/22541* (2018.08); *H04N 5/23258* (2013.01); *H04N 5/23267* (2013.01); *H04N 5/23287* (2013.01); *H04N 5/23296* (2013.01); *G03B 2205/0038* (2013.01); *G03B 2205/0046* (2013.01)

(58) Field of Classification Search
CPC ........... H04N 5/23267; H04N 5/23287; H04N 5/23296; H04N 5/23258; G03B 17/14; G03B 2205/0038; G03B 2205/0046; G03B 5/00
See application file for complete search history.

(56) References Cited

U.S. PATENT DOCUMENTS

| 2008/0180536 A1* | 7/2008 | Nakahara | H04N 5/23264 |
| | | | 348/208.99 |
| 2016/0360113 A1 | 12/2016 | Ardö | |
| 2018/0309932 A1* | 10/2018 | Nadamoto | H04N 5/23287 |

FOREIGN PATENT DOCUMENTS

| JP | 2007034141 A | 2/2007 |
| JP | 2015210493 A | 11/2015 |

OTHER PUBLICATIONS

An Office Action mailed by China National Intellectual Property Administration dated Nov. 26, 2020, which corresponds to Chinese Patent Application No. 201880062899.6 and is related to U.S. Appl. No. 16/829,095; with English language translation.
International Search Report issued in PCT/JP2018/035886; dated Nov. 13, 2018.
International Preliminary Report On Patentability and Written Opinion issued in PCT/JP2018/035886; dated Mar. 31, 2020.

* cited by examiner

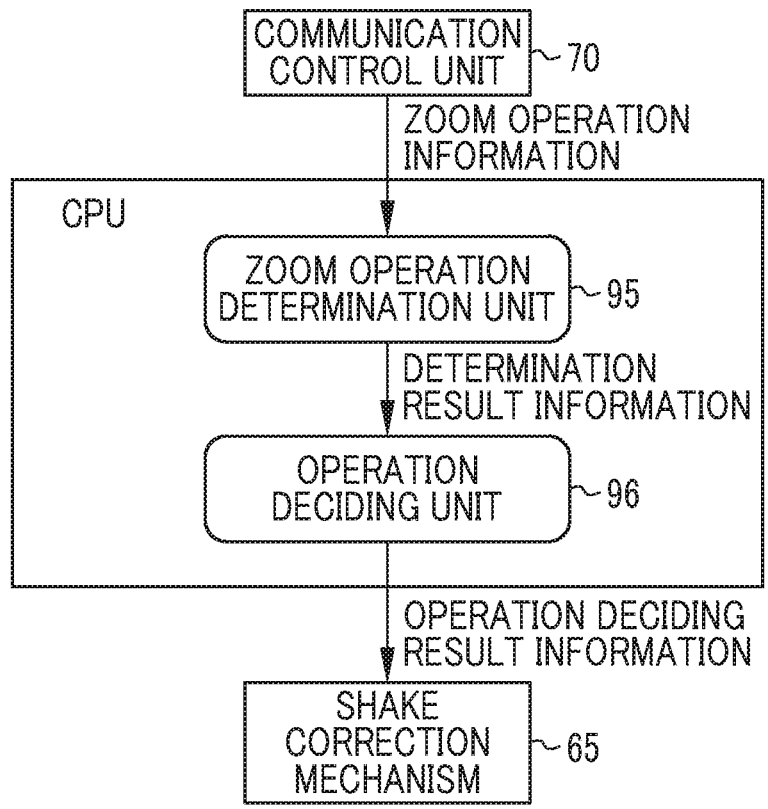

FIG. 10

| DETERMINATION RESULT INFORMATION | DURING ZOOM OPERATION STOP | DURING ZOOM OPERATION |
|---|---|---|
| | ⬇ | ⬇ |
| | OPERATION DECIDING RESULT INFORMATION A | OPERATION DECIDING RESULT INFORMATION C |
| ROTATION OPERATION | ALLOW | (MOVE TO ORIGIN POSITION →) OPERATION PROHIBITION |
| SHIFT OPERATION | ALLOW | (MOVE TO ORIGIN POSITION →) OPERATION PROHIBITION |

FIG. 11

| DETERMINATION RESULT INFORMATION | DURING ZOOM OPERATION STOP | DURING ZOOM OPERATION |
|---|---|---|
| | ⬇ | ⬇ |
| | OPERATION DECIDING RESULT INFORMATION A | OPERATION DECIDING RESULT INFORMATION D |
| ROLL OPERATION | ALLOW | ALLOW |
| PITCH OPERATION | ALLOW | (MOVE TO ORIGIN POSITION →) OPERATION PROHIBITION |
| YAW OPERATION | ALLOW | (MOVE TO ORIGIN POSITION →) OPERATION PROHIBITION |
| SHIFT OPERATION | ALLOW | (MOVE TO ORIGIN POSITION →) OPERATION PROHIBITION |

FIG. 12

| DETERMINATION RESULT INFORMATION | DURING ZOOM OPERATION STOP | DURING ZOOM OPERATION |
|---|---|---|
| | ⇩ | ⇩ |
| | OPERATION DECIDING RESULT INFORMATION A | OPERATION DECIDING RESULT INFORMATION E |
| ROTATION OPERATION | ALLOW | ALLOW |
| SHIFT OPERATION | ALLOW | RANGE RESTRICTION |

SHIFT OPERATION

IMAGING DEVICE INCLUDING SHAKE CORRECTION MECHANISM, AND OPERATION METHOD AND OPERATION PROGRAM THEREOF

CROSS-REFERENCE TO RELATED APPLICATIONS

This application is a Continuation of PCT International Application No. PCT/JP2018/035886 filed on 27 Sep. 2018, which claims priority under 35 U.S.C § 119(a) to Japanese Patent Application No. 2017-187466 filed on 28 Sep. 2017. The above application is hereby expressly incorporated by reference, in its entirety, into the present application.

BACKGROUND OF THE INVENTION

1. Field of the Invention

The present invention relates to an imaging device, and an operation method and an operation program thereof.

2. Description of the Related Art

A digital camera is widely used as an imaging device comprising an image sensor that captures a subject. A subject image is formed on an imaging surface of the image sensor through an imaging optical system. The imaging optical system is housed in a lens barrel, and these are collectively referred to as, for example, a lens portion. Some lens portions are provided in a camera body, and some lens portions are provided separately from the camera body and are interchangeably mounted on a mount portion of the camera body (so-called lens unit).

There is a known lens portion having a zoom function for enlarging and reducing a subject image. An imaging optical system of the lens portion having the zoom function includes a zoom lens. The zoom lens moves along an optical axis between a telephoto end and a wide (wide angle) end in response to a zoom instruction from a user. Hereinafter, the movement of the zoom lens in response to the zoom instruction is referred to as a zoom operation.

The digital camera comprises a live view display function for displaying a captured image of a subject imaged by an image sensor on a display unit such as a liquid crystal display in real time. The digital camera also comprises a shake correction mechanism that cancels the influence of a shake occurring in a case where the user does not hold the camera in a stable and correct manner or in a case where the camera is installed on a vehicle such as a car or a ship.

JP2007-034141A describes a lens interchangeable digital camera equipped with a lens unit having a zoom function and comprising a sensor movement type shake correction mechanism. The sensor movement type shake correction mechanism performs a sensor movement operation of moving an image sensor in a direction to cancel a shake with respect to an imaging optical system.

SUMMARY OF THE INVENTION

The sensor movement operation includes a rotation operation of rotationally moving the image sensor in a state where a point through which the optical axis of the imaging optical system passes (hereinafter referred to as optical center) matches a center point of the imaging surface (hereinafter referred to as image center), and a shift operation of moving the image sensor parallel to a plane perpendicular to the optical axis of the imaging optical system. The optical center and the image center do not shift in the rotation operation, but are shifted in the shift operation.

Consider a case where the shift between the optical center and the image center due to the shift operation occurs during the zoom operation. In the case, in the captured image of the live view display function, for example, a zoom instruction is performed with intention of enlarging a face of a person appearing at the image center. However, the captured image may be enlarged based on the optical center since the optical center is located at a position shifted from the face of the person appearing at the image center. As a result, the face of the person appearing at the image center before the enlargement may move to an edge of the captured image without remaining at the image center after the enlargement. For this reason, in a case where the shift between the optical center and the image center occurs during the zoom operation, imaging composition may be inconsistent with user intention.

An object of the present invention is to provide an imaging device, and an operation method and an operation program thereof capable of always obtaining imaging composition consistent with the user intention in a case where a zoom operation is performed.

In order to solve the above problems, an imaging device according to the invention includes an image sensor, a sensor movement type shake correction mechanism, a zoom operation determination unit, and an operation deciding unit. In the image sensor, a subject image is formed on an imaging surface through an imaging optical system including a zoom lens. The sensor movement type shake correction mechanism performs a sensor movement operation of moving the image sensor in a direction to cancel a shake. The zoom operation determination unit determines whether or not a zoom operation in which the zoom lens moves is being performed. The operation deciding unit decides an operation of the shake correction mechanism and restricts at least a part of the sensor movement operation which is allowed while the zoom operation is stopped in a case where the zoom operation determination unit determines that the zoom operation is being performed.

It is preferable that the sensor movement operation includes a plurality of types of sensor movement operations having different movement directions of the image sensor, and the operation deciding unit restricts at least one of the plurality of types of sensor movement operations.

It is preferable that the plurality of types of sensor movement operations include a rotation operation of rotationally moving the image sensor in a state where an optical center which is a point through which an optical axis of the imaging optical system passes matches an image center which is a center point of the imaging surface and a shift operation of moving the image sensor in parallel with a plane perpendicular to the optical axis, and the operation deciding unit restricts at least the shift operation in a case where the zoom operation determination unit determines that the zoom operation is being performed.

It is preferable that the operation deciding unit allows the rotation operation regardless of whether the zoom operation is being performed or stopped.

It is preferable that the operation deciding unit changes a degree of the restriction according to a focal length that changes with the zoom operation.

It is preferable that the restriction executed by the operation deciding unit while the zoom operation is performed includes an operation prohibition for prohibiting the sensor movement operation, and in the case where the zoom operation determination unit determines that the zoom operation is being performed while the sensor movement type shake correction mechanism is operated, the operation deciding unit moves the image sensor to an origin position and then executes the operation prohibition.

It is preferable that the operation deciding unit executes the operation prohibition in a case where the focal length is equal to or larger than a preset threshold value and does not execute the operation prohibition in a case where the focal length is less than the threshold value.

It is preferable that the restriction executed by the operation deciding unit while the zoom operation is performed includes a range restriction that restricts a movable range of the image sensor compared with the movable range while the zoom operation is stopped.

It is preferable that the operation deciding unit restricts the movable range in a case where the focal length is long compared with the movable range in a case where the focal length is short.

It is preferable to provide a mount portion on which a plurality of types of lens units are interchangeably mounted.

It is preferable that in a case where the lens unit having a lens movement type shake correction mechanism that performs a lens movement operation of moving a correction lens which is a part of a plurality of lenses constituting the imaging optical system in a direction to cancel the shake is mounted on the mount portion, the operation deciding unit causes the lens movement type shake correction mechanism to perform the lens movement operation of canceling the sensor movement operation of moving the image sensor to the origin position.

It is preferable that in the case where the lens unit having a lens movement type shake correction mechanism that performs a lens movement operation of moving a correction lens which is a part of a plurality of lenses constituting the imaging optical system in a direction to cancel the shake is mounted on the mount portion, the operation deciding unit releases the restriction of the sensor movement operation in a case where the correction lens reaches an end of a movable range and the cancellation of the shake in the lens movement operation reaches a limit while the zoom operation is performed.

An operation method of an imaging device according to the invention includes a zoom operation determination step and an operation deciding step. The imaging device includes an image sensor in which a subject image is formed on an imaging surface through an imaging optical system including a zoom lens and a sensor movement type shake correction mechanism that performs a sensor movement operation of moving the image sensor in a direction to cancel a shake. The zoom operation determination step determines whether or not a zoom operation in which the zoom lens moves is being performed. The operation deciding step decides an operation of the shake correction mechanism and restricts at least a part of the sensor movement operation which is allowed while the zoom operation is stopped in a case where determination is made in the zoom operation determination step that the zoom operation is being performed.

An operation program of an imaging device according to the invention causes a computer to execute a zoom operation determination function and an operation deciding function. The imaging device includes an image sensor in which a subject image is formed on an imaging surface through an imaging optical system including a zoom lens and a sensor movement type shake correction mechanism that performs a sensor movement operation of moving the image sensor in a direction to cancel a shake. The zoom operation determination function determines whether or not a zoom operation in which the zoom lens moves is being performed. The operation deciding function decides an operation of the shake correction mechanism and restricts at least a part of the sensor movement operation which is allowed while the zoom operation is stopped in a case where determination is made by the zoom operation determination function that the zoom operation is being performed.

The present invention restricts at least a part of the sensor movement operation of moving the image sensor in the direction to cancel the shake, which is allowed while the zoom operation is stopped. Therefore, it is possible to provide an imaging device, and an operation method and an operation program thereof capable of always obtaining imaging composition consistent with the user intention in the case where the zoom operation is performed.

BRIEF DESCRIPTION OF THE DRAWINGS

FIG. 7 is a block diagram of a CPU of the lens interchangeable digital camera.

FIG. 8 is a table showing operation deciding result information with respect to determination result information.

FIG. 10 is a table showing operation deciding result information for prohibiting also a rotation operation in a case where a zoom operation is being performed.

FIG. 11 is a table showing operation deciding result information for allowing only a roll operation in the case where the zoom operation is being performed.

FIG. 12 is a table showing operation deciding result information for restricting a range of a shift operation in the case where the zoom operation is being performed.

DESCRIPTION OF THE PREFERRED EMBODIMENTS

First Embodiment

Figure 1:
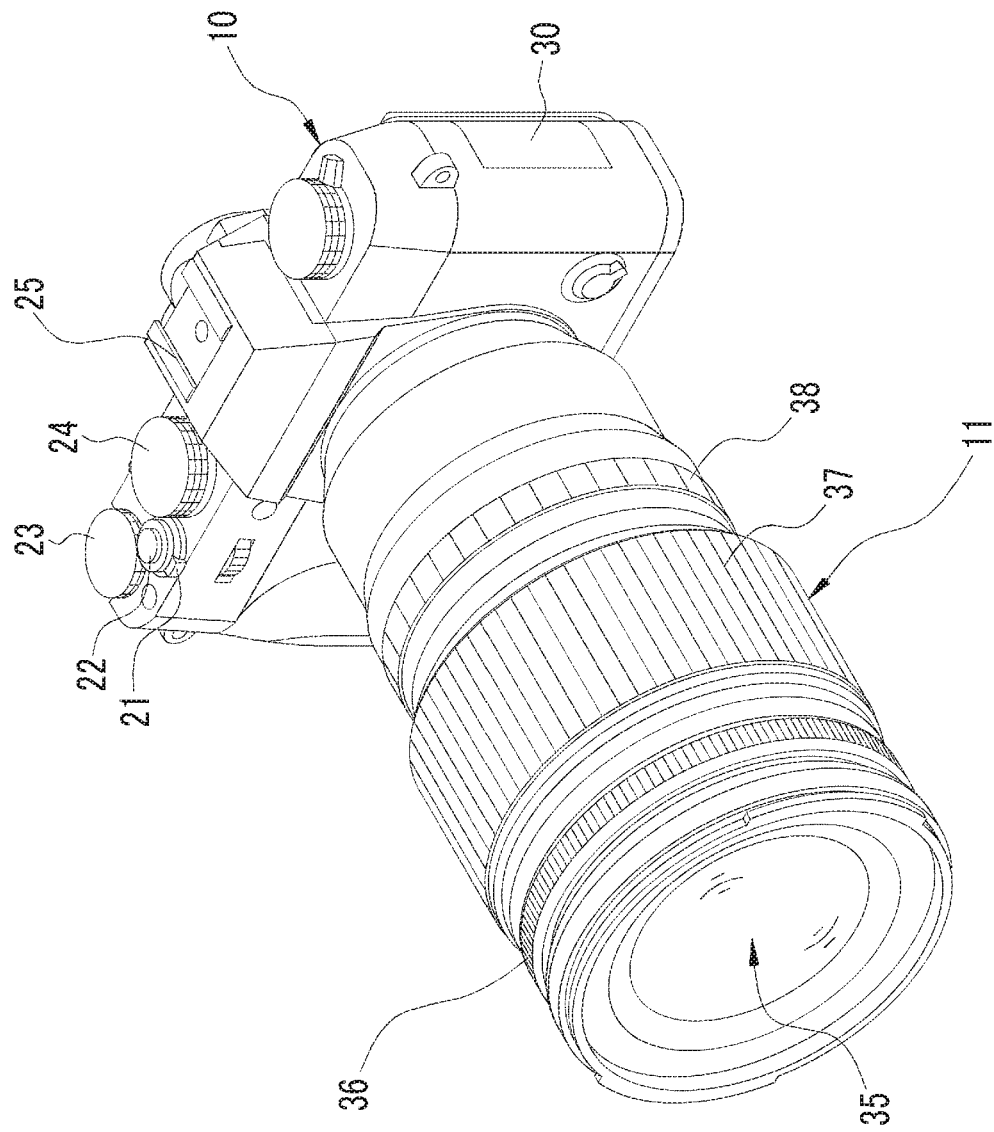
FIG. 1 is a front external perspective view of a lens interchangeable digital camera on which a lens unit is mounted.
Figure 2:
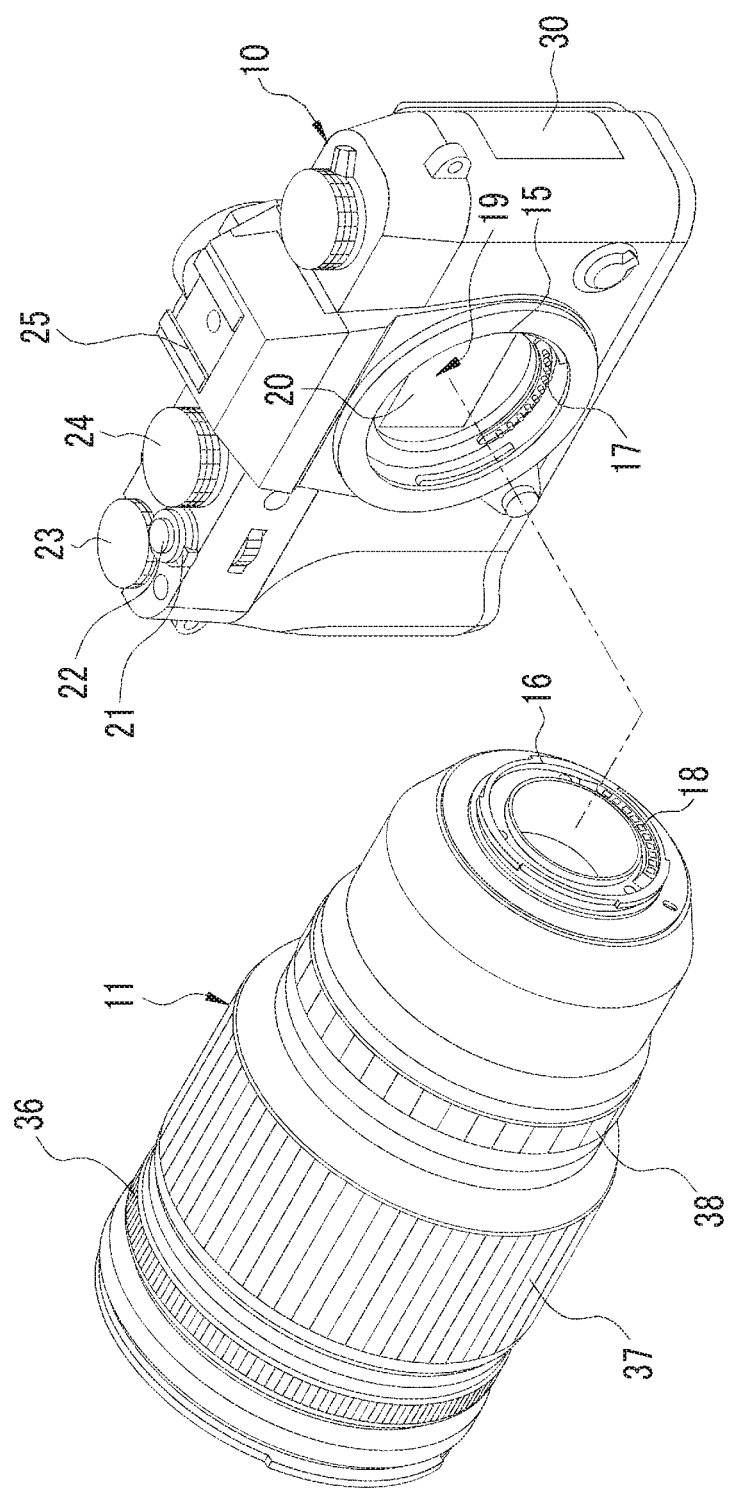
FIG. 2 is a front external perspective view of the lens interchangeable digital camera from which the lens unit is detached.
Figure 3:
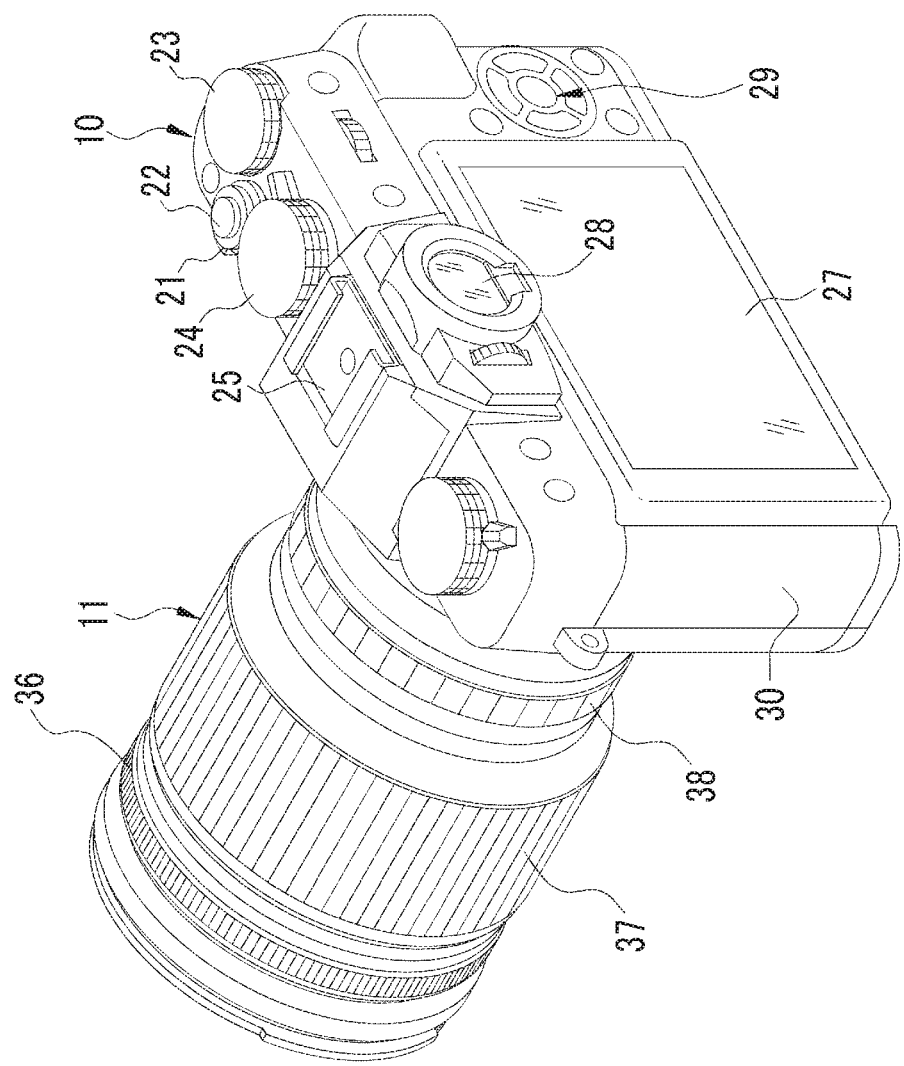
FIG. 3 is a rear external perspective view of the lens interchangeable digital camera on which a lens unit is mounted.

In FIGS. 1 to 3, a lens unit 11 is interchangeably mounted on a lens interchangeable digital camera (hereinafter simply referred to as a camera) 10 as an imaging device. A mount portion 15 which is a circular opening is provided on a front surface of the camera 10. On the other hand, an engaging portion 16 that engages with the mount portion 15 is provided at a rear end of the lens unit 11. The engaging portion 16 is engaged with the mount portion 15 to mount the lens unit 11 to the camera 10. FIGS. 1 and 3 show a state where the lens unit 11 is mounted on the camera 10, and FIG. 2 shows a state where the lens unit 11 is detached from the camera 10.

A plurality of signal contacts 17 are disposed on the mount portion 15. Similarly, a plurality of signal contacts 18 are disposed on the engaging portion 16. In a case where the lens unit 11 is mounted on the camera 10, the signal contacts 17 and the signal contacts 18 are in contact with each other and are electrically connected. Communication between the camera 10 and the lens unit 11 becomes possible due to the connection between the signal contacts 17 and 18.

An image sensor 19 is mounted on the camera 10. The image sensor 19 is disposed on a deep side of the mount portion 15. The image sensor 19 is, for example, a charge coupled device (CCD) type or a complementary metal oxide semiconductor (CMOS) type, and has a rectangular imaging surface 20. A plurality of pixels are arranged in a matrix on the imaging surface 20. The pixel photoelectrically converts a subject image formed on the imaging surface 20 and outputs an imaging signal which is a source of image data of the subject.

A power lever 21, a release switch 22, an exposure correction dial 23, a shutter speed/International Organization for Standardization (ISO) sensitivity dial 24, a hot shoe 25, and the like are provided on an upper surface of the camera 10.

The power lever 21 is operated in a case where power of the camera 10 is turned on and off. The release switch 22 is operated in a case where static image imaging is instructed or in a case where the start and the end of video imaging are instructed. The release switch 22 is a two-stage press type.

In a case where the release switch 22 is pressed to a first stage (half-pressed), a well-known imaging preparation processing such as automatic focus adjustment or automatic exposure control is executed. In a case where the release switch 22 is pressed to a second stage (fully-pressed), the image sensor 19 is caused to execute a main imaging operation (an operation of accumulating electric charges in the pixels and outputting an imaging signal corresponding to the accumulated electric charges). Accordingly, imaging processing for recording image data output from the image sensor 19 as a captured image is executed. Hereinafter, the full press of the release switch 22 is referred to as a release operation.

The exposure correction dial 23 is operated in a case where an exposure value is corrected. The shutter speed/ISO sensitivity dial 24 is operated in a case where the shutter speed and ISO sensitivity are set. An external flash device is attachably and detachably mounted on the hot shoe 25.

A display unit 27, an optical viewfinder 28, an operation key group 29, and the like are provided on a rear surface of the camera 10. The display unit 27 is composed of a liquid crystal display, for example. The display unit 27 performs so-called live view display in which the captured image of the subject represented by the image data from the image sensor 19 is displayed in real time. This live view display function is temporarily stopped during the imaging processing accompanying the release operation and resumed after the imaging processing ends. In addition to the live view display, the display unit 27 performs playback display of a recorded captured image or display of various setting screens. The optical viewfinder 28 displays a subject image formed through the lens unit 11 and a pentaprism (not shown). The operation key group 29 is operated in a case where various settings are performed on the various setting screens. A portion indicated by a reference numeral 30 in FIGS. 1 to 3 is a cover that covers a memory card slot on which a memory card 77 (refer to FIG. 5) is attachably and detachably mounted.

An imaging optical system 35 is built in the lens unit 11. The imaging optical system 35 forms a subject image on the imaging surface 20 of the image sensor 19. Various operation rings such as a focus ring 36, a zoom ring 37, and an iris ring 38 are mounted on the outer periphery of the lens unit 11. The above rings are rotatable along a circumferential direction. The focus ring 36 is operated during manual focus adjustment, the zoom ring 37 is operated during zooming, and the iris ring 38 is operated in a case where an opening of an aperture stop formed by a stop mechanism 46 is set (refer to FIG. 4).

Figure 4:
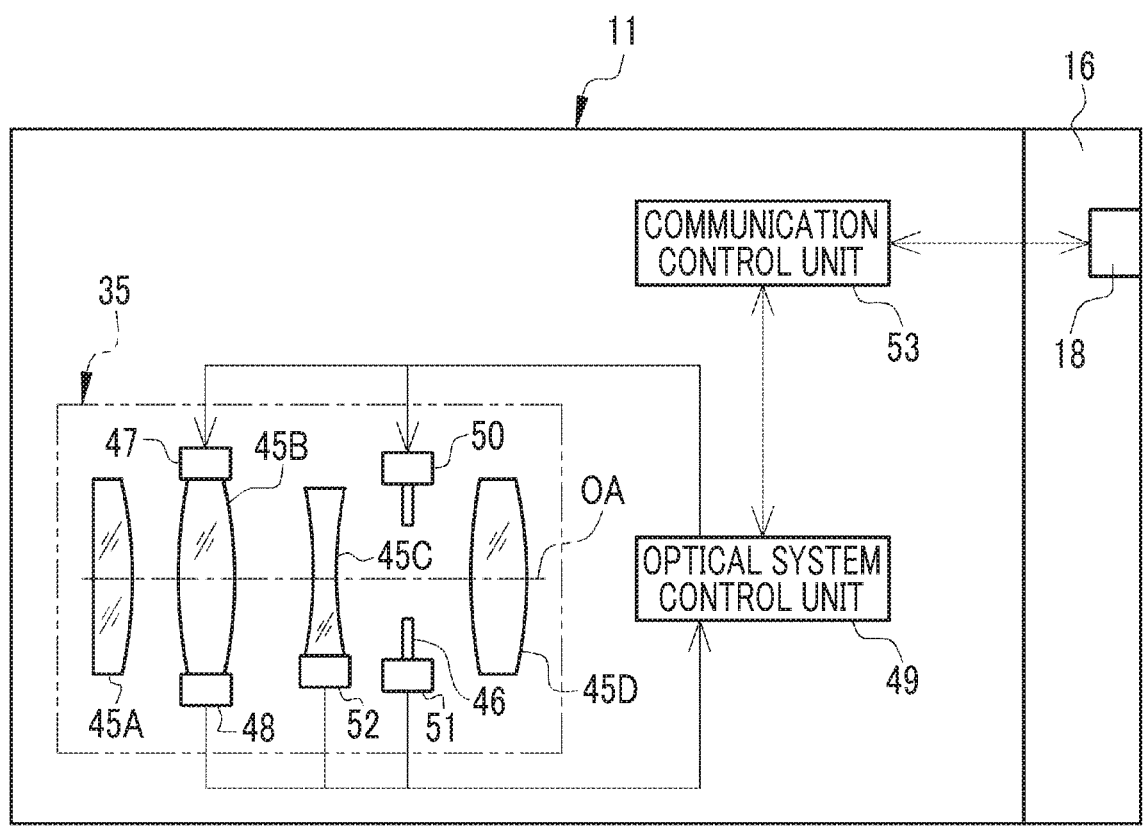
FIG. 4 is a block diagram of the lens unit.

As shown in FIG. 4, the imaging optical system 35 comprises, for example, a plurality of lenses 45A, 45B, 45C, and 45D and the stop mechanism 46. The lens 45A is a lens disposed at the forefront (subject side) of the imaging optical system 35, and the lens 45D is a lens disposed at the rearmost (image sensor 19 side) of the imaging optical system 35. The focus lens 45B for the focus adjustment and the zoom lens 45C for the zooming are disposed between the lenses 45A and 45D. As is well known, the stop mechanism 46 has a plurality of stop leaf blades. The stop leaf blades form a substantially circular aperture stop and change a size of the aperture stop to restrict an amount of incidence ray.

The focus lens 45B moves along an optical axis OA in response to an operation of the focus ring 36. The zoom lens 45C moves along the optical axis OA in response to an operation of the zoom ring 37.

An actuator 47 such as a motor and a position detection sensor 48 that detects a position on the optical axis OA are connected to the focus lens 45B. An optical system control unit 49 operates the actuator 47 to move the focus lens 45B along the optical axis OA while checking the position of the focus lens 45B on the optical axis OA based on a detection result of the position detection sensor 48 during the automatic focus adjustment.

The stop mechanism 46 is also connected with an actuator 50 such as a motor for opening and closing the stop leaf blades and an opening detection sensor 51 for detecting the opening of the aperture stop. The optical system control unit 49 operates the actuator 50 to open and close the stop leaf blades while checking the opening of the aperture stop based on a detection result of the opening detection sensor 51. The optical system control unit 49 opens and closes the stop leaf blades such that an opening calculated on the camera 10 side is obtained during the automatic exposure control. Except during the automatic exposure control, the stop leaf blades are opened and closed such that an opening set by the iris ring 38 is obtained.

The position detection sensor 52 for detecting the position on the optical axis OA is connected to the zoom lens 45C, but an actuator such as the motor is not connected thereto. That is, the zoom lens 45C moves along the optical axis OA only in the case of the manual operation of the zoom ring 37. The actuator such as the motor may be connected to the zoom lens 45C such that the optical system control unit 49 can be electrically controlled.

A communication control unit 53 controls communication with the camera 10 through the signal contacts 18 of the engaging portion 16. The optical system control unit 49 is connected to the communication control unit 53. The communication control unit 53 outputs various types of information, such as the position of the focus lens 45B in the automatic focus adjustment or the calculation result of the opening of the aperture stop in the automatic exposure control, to be transmitted from the camera 10 side to the optical system control unit 49. The optical system control unit 49 operates the actuators 47 and 50 to adjust the position of the focus lens 45B or the opening of the aperture stop based on the various types of information from the communication control unit 53.

Further, zoom operation information is input from the optical system control unit 49 to the communication control unit 53. The zoom operation information is output from the optical system control unit 49 to the communication control unit 53 in a case where the zoom ring 37 is operated to move the zoom lens 45C along the optical axis OA, and the position detection sensor 52 detects changing of a position of the zoom lens 45C on the optical axis OA, that is, in a case where the zoom operation is being performed. The communication control unit 53 transmits the zoom operation information from the optical system control unit 49 to the camera 10.

Figure 5:
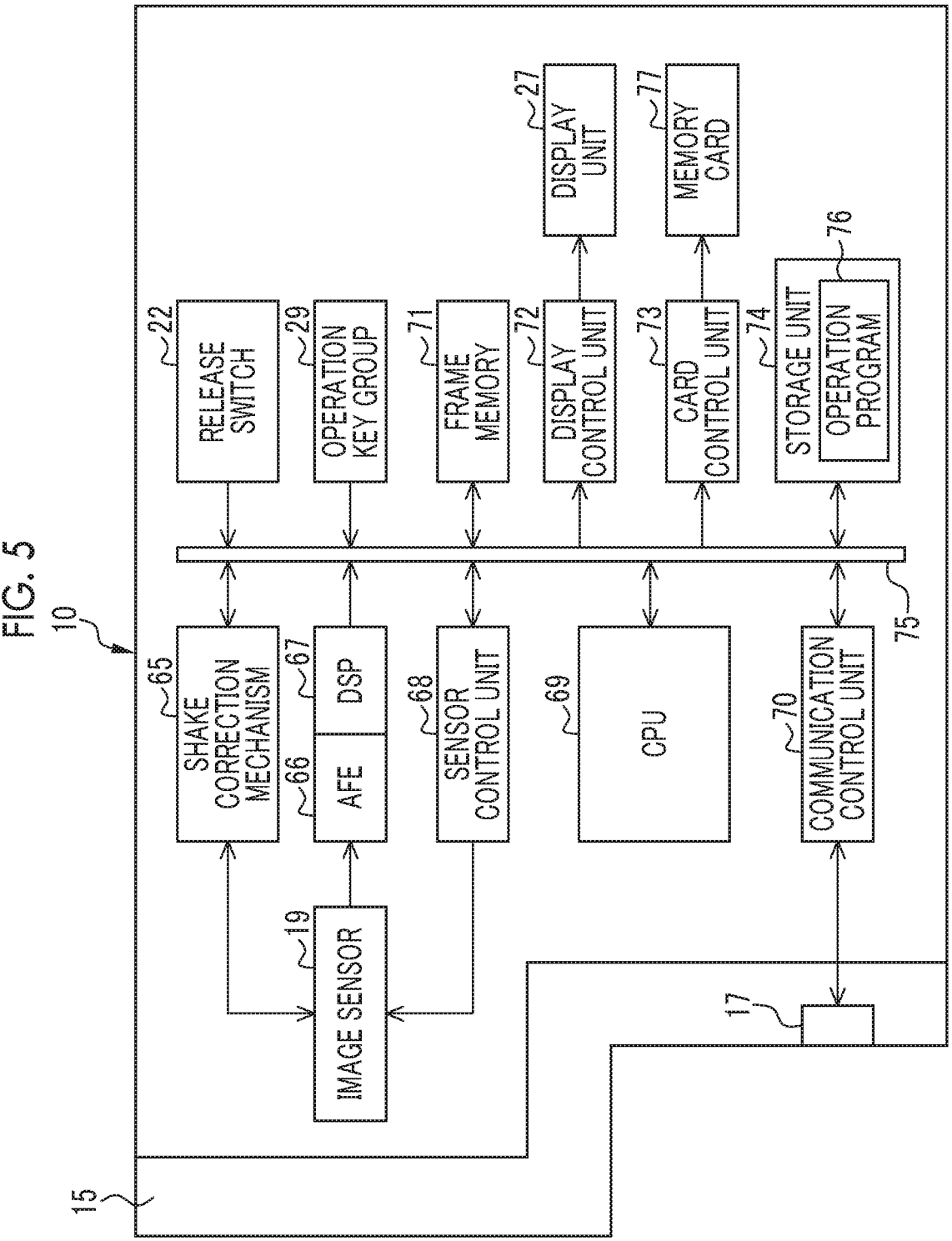
FIG. 5 is a block diagram of the lens interchangeable digital camera.

In FIG. 5, the camera 10 comprises a shake correction mechanism 65, an analog front end (AFE) 66, a digital signal processor (DSP) 67, a sensor control unit 68, and a central processing unit (CPU) 69, a communication control unit 70, a frame memory 71, a display control unit 72, a card control unit 73, and a storage unit 74. These are connected to each other through a data bus 75.

The shake correction mechanism 65 executes shake correction for canceling the influence of a shake occurring in a case where the user does not hold the camera 10 in a stable and correct manner or in a case where the camera 10 is installed on a vehicle such as a car or a ship. The shake correction mechanism 65 is a sensor movement method that performs a sensor movement operation of moving the image sensor 19 in a direction to cancel the shake.

The AFE 66 performs correlative double sampling processing, amplification processing, or analog/digital conversion processing on the analog imaging signal from the image sensor 19 to convert the signal into image data having a gradation value corresponding to a predetermined number of bits and outputs the image data to the DSP 67. The DSP 67 performs known signal processing such as gamma-correction processing, defective pixel correction processing, white balance correction processing, and demosaicing on the image data from the AFE 66.

The sensor control unit 68 controls the operation of the image sensor 19. Specifically, the sensor control unit 68 outputs a sensor control signal synchronized with a reference clock signal to be input from the CPU 69 to the image sensor 19 and causes the image sensor 19 to output an imaging signal at a predetermined frame rate.

The CPU 69 integrally controls the operation of each unit of the camera 10 based on an operation program 76 stored in the storage unit 74. For example, the CPU 69 executes the imaging preparation processing in response to the half press of the release switch 22 and executes the imaging processing in response to the release operation (full press of the release switch 22). Further, the CPU 69 executes processing according to various setting signals from the operation key group 29. FIG. 5 shows only the release switch 22 and the operation key group 29. However, the power lever 21, the exposure correction dial 23, the shutter speed/ISO sensitivity dial 24, and the like described above are also connected to the data bus 75, and the CPU 69 executes processing corresponding to these operation signals.

The communication control unit 70 controls communication with the lens unit 11 through the signal contacts 17 of the mount portion 15. For example, the communication control unit 70 receives the zoom operation information to be transmitted from the communication control unit 53.

The frame memory 71 stores one-frame image data subjected to various types of signal processing by the DSP 67. The image data to be stored in the frame memory 71 is updated at any time at a predetermined frame rate.

The display control unit 72 converts the image data into a video signal such as a composite signal or a component signal and outputs the video signal to the display unit 27 as the captured image. More specifically, the display control unit 72 reads out the image data to be updated at any time at a predetermined frame rate from the frame memory 71 and causes the display unit 27 to perform the live view display based on the read image data. In addition, the display control unit 72 causes the display unit 27 to play and display the captured image recorded in the memory card 77. In addition to the above, the display control unit 72 causes the display unit 27 to display the various setting screens.

The card control unit 73 controls the recording of the captured image on the memory card 77 and the reading out of the captured image from the memory card 77. In the imaging processing accompanying the release operation, the card control unit 73 records the image data stored in the frame memory 71 at the time of the imaging processing in the memory card 77 as the captured image.

Figure 6:
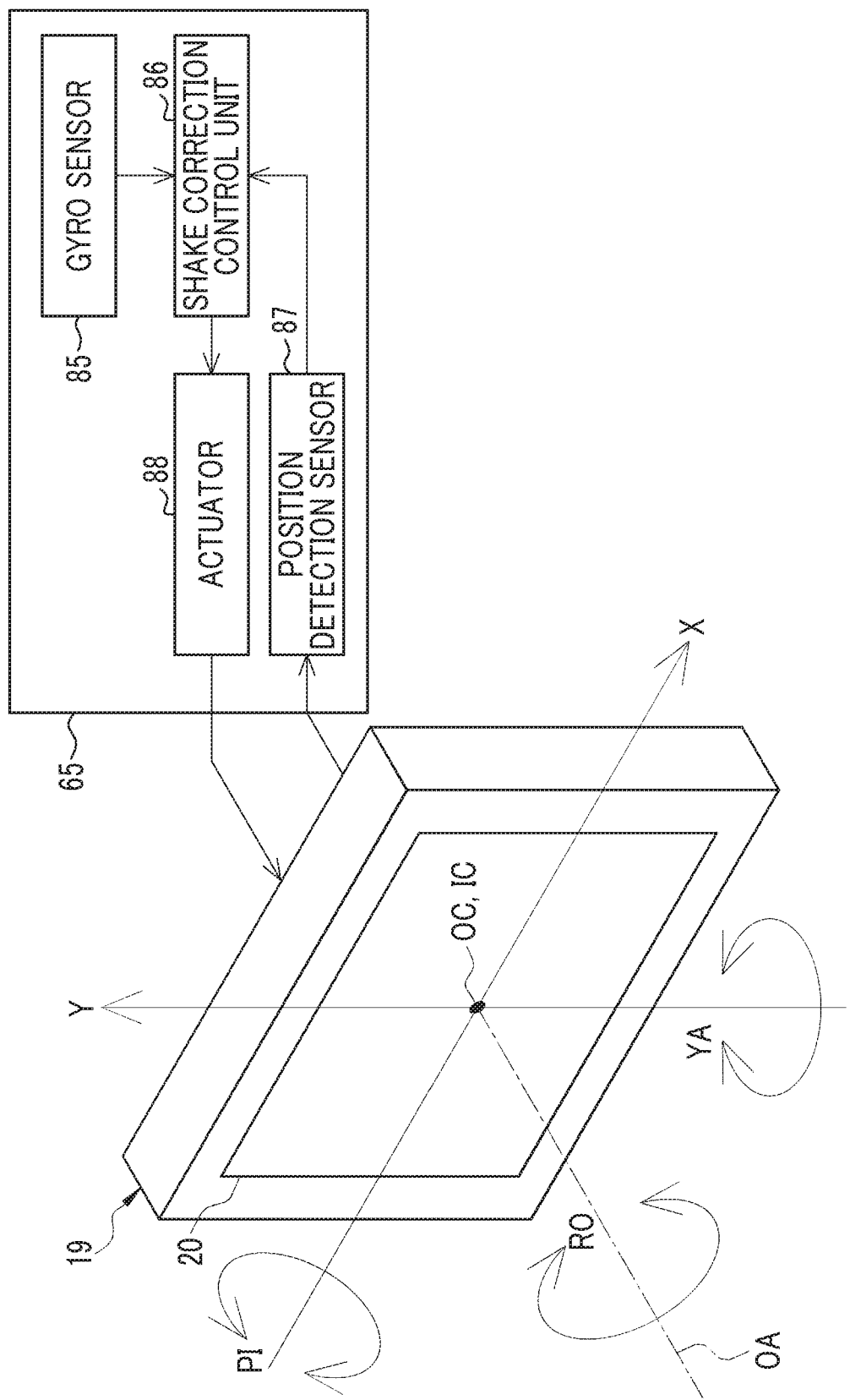
FIG. 6 is a diagram showing details of a shake correction mechanism and a sensor movement operation.

In FIG. 6, the shake correction mechanism 65 is composed of a gyro sensor 85, a shake correction control unit 86, a position detection sensor 87, and an actuator 88. The gyro sensor 85 detects a shake and outputs the detection result to the shake correction control unit 86. The shake correction control unit 86 calculates a movement amount of the image sensor 19 for canceling the shake detected by the gyro sensor

85. The shake correction control unit 86 finely adjusts the calculated movement amount based on a current position of the image sensor 19 from the position detection sensor 87 and outputs the result to the actuator 88. The actuator 88 moves the image sensor 19 by the movement amount from the shake correction control unit 86.

The sensor movement operation includes a plurality of types of sensor movement operations in which movement directions of the image sensor 19 are different. The plurality of types of sensor movement operations include a rotation operation and a shift operation. The rotation operation is to rotate and move the image sensor 19 in a state where an optical center OC which is a point through which the optical axis OA passes and an image center IC which is the center point of the imaging surface 20 are matched. For this reason, the optical center OC and the image center IC do not shift in the rotation operation. On the contrary, the shift operation is to move the image sensor 19 in parallel with a plane perpendicular to the optical axis OA (XY plane). For this reason, the optical center OC and the image center IC are shifted in the shift operation.

The rotation operation includes a roll operation, a pitch operation, and a yaw operation. The roll operation is to rotate the image sensor 19 around the optical axis OA as indicated by an arrow RO. The pitch operation is to rotate the image sensor 19 around the X-axis along a long side of the imaging surface 20 as indicated by an arrow PI. The yaw operation is to rotate the image sensor 19 around the Y-axis along a short side of the imaging surface 20, perpendicular to the X-axis, as indicated by an arrow YA.

The shift operation includes a horizontal shift operation and a vertical shift operation. The horizontal shift operation is to move the image sensor 19 along the X-axis. The vertical shift operation is to move the image sensor 19 along the Y-axis. As described above, the shake correction mechanism 65 has a so-called five-axis shake correction function for performing a total of five types of sensor movement operations including the roll operation, the pitch operation, the yaw operation, a horizontal shift operation, and the vertical shift operation.

In FIG. 7, in a case where the operation program 76 is activated, the CPU 69 functions as a zoom operation determination unit 95 and an operation deciding unit 96.

The zoom operation determination unit 95 has a zoom operation determination function for determining whether or not the zoom operation is being performed. More specifically, in a case where the zoom operation information is input from the communication control unit 70, the zoom operation determination unit 95 determines that the zoom operation is being performed. On the contrary, in a case where the zoom operation information is not input from the communication control unit 70, the zoom operation determination unit 95 determines that the zoom operation is stopped. The zoom operation determination unit 95 outputs determination result information (refer to FIG. 8) indicating the determination result to the operation deciding unit 96.

The operation deciding unit 96 has an operation deciding function for deciding the operation of the shake correction mechanism 65 according to the determination result information from the zoom operation determination unit 95. In a case where the zoom operation determination unit 95 determines that the zoom operation is being performed, the operation deciding unit 96 restricts at least a part of the sensor movement operation that is allowed while the zoom operation is stopped. The operation deciding unit 96 outputs the operation deciding result information indicating the decided operation to the shake correction mechanism 65.

The operation deciding result information is information in which allowance or restriction on the operation is set for the rotation operation and the shift operation, respectively (refer to FIG. 8).

Although not shown, the CPU 69 is provided with an image correction unit that corrects optical characteristics (edge part dimming, distortion, etc.) of the imaging optical system 35 of the lens unit 11 or image processing unit that performs various types of image processing such as color enhancement processing or outline enhancement processing.

FIG. 8 shows a pattern of the operation deciding result information with respect to the determination result information. First, in a case where the determination result information indicating that the zoom operation is stopped is output from the zoom operation determination unit 95, the operation deciding unit 96 outputs operation deciding result information A indicating that both the rotation operation and the shift operation are allowed. On the other hand, in a case where determination result information indicating that the zoom operation is being performed is output from the zoom operation determination unit 95, the operation deciding unit 96 outputs operation deciding result information B indicating that the rotation operation is allowed but the shift operation is prohibited and restricted.

That is, the operation deciding unit 96 restricts at least the shift operation and allows the rotation operation regardless of whether the zoom operation is being performed or stopped. Further, the restriction executed by the operation deciding unit 96 during the zoom operation includes operation prohibition.

In a case where the zoom operation determination unit 95 determines that the zoom operation is being performed during the operation of the shake correction mechanism 65 and the optical center OC and the image center IC are shifted due to the shift operation, the operation deciding unit 96 moves the image sensor 19 to an origin position where the optical center OC matches the image center IC and then executes the operation prohibition.

Figure 9:
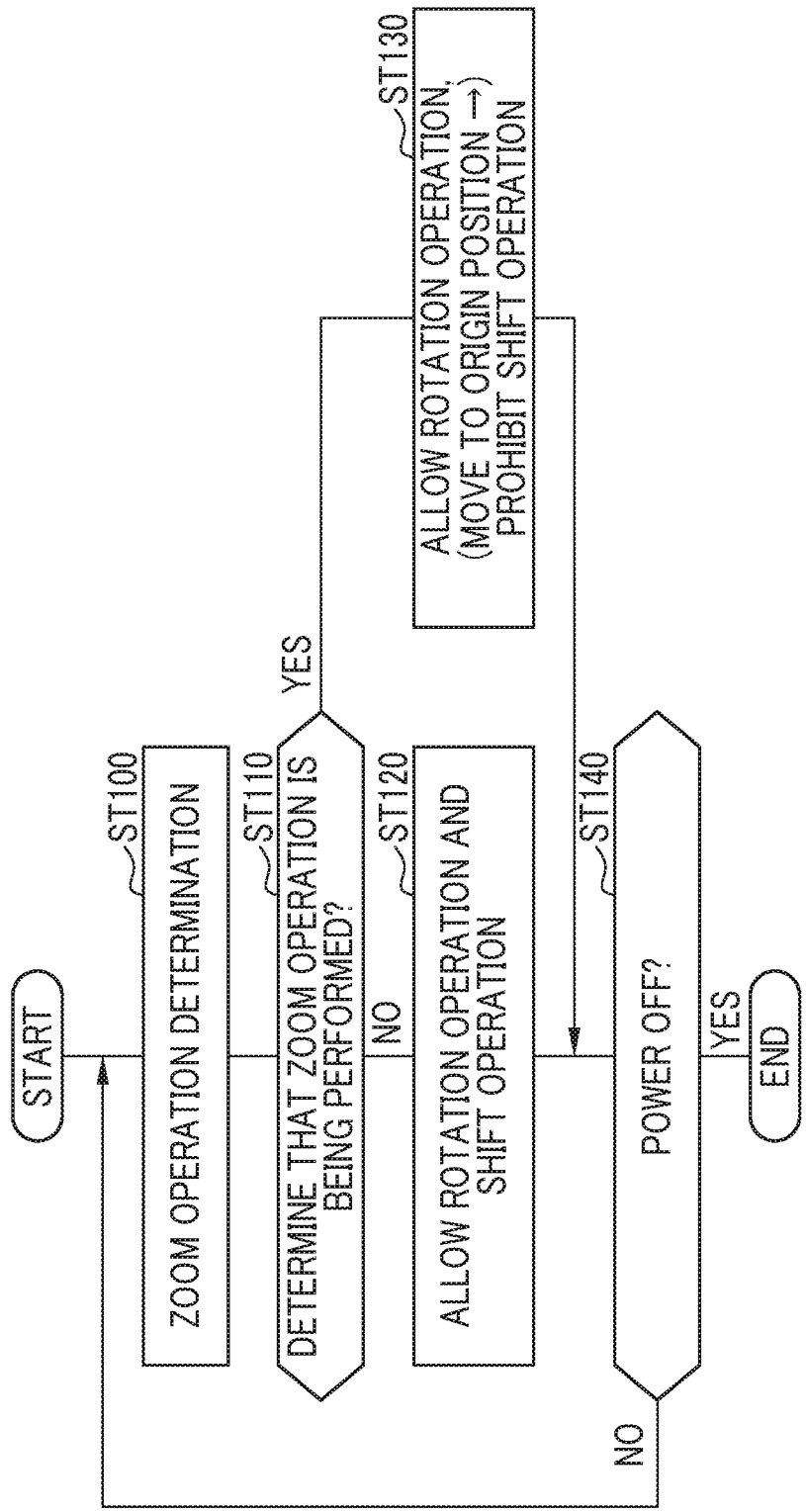
FIG. 9 is a flowchart showing a processing procedure of the lens interchangeable digital camera.

Actions of the above configuration will be described with reference to a flowchart in FIG. 9. First, the zoom operation determination unit 95 determines whether or not the zoom operation is being performed (step ST100, zoom operation determination step).

In a case where determination is made that the zoom operation is stopped (NO in step ST110), the determination result information indicating that the zoom operation is stopped is output from the zoom operation determination unit 95 to the operation deciding unit 96 as shown in FIG. 8. As indicated by the operation deciding result information A, the operation deciding unit 96 decides that both the rotation operation and the shift operation are allowed (step ST120, operation deciding step). In response to the deciding (operation deciding result information A), the rotation operation and the shift operation are allowed in the shake correction mechanism 65.

On the other hand, in a case where determination is made that the zoom operation is being performed (YES in step ST110), the determination result information indicating that the zoom operation is being performed is output from the zoom operation determination unit 95 to the operation deciding unit 96 as shown in FIG. 8. In the case, as indicated by the operation deciding result information B, the operation deciding unit 96 decides that the rotation operation is allowed but the shift operation is prohibited and restricted (step ST130, operation deciding step). In response to the deciding (operation deciding result information B), the rotation operation is allowed and the shift operation is prohibited in the shake correction mechanism 65. In the case, the image sensor 19 is moved to the origin position where the optical center OC matches the image center IC and then the operation prohibition is executed, in a case where the optical center OC and the image center IC are shifted due to the shift operation. These series of pieces of processing are continued until the power lever 21 is operated and the power of the camera 10 is turned off (YES in step ST140).

At least a part of the sensor movement operation by the shake correction mechanism 65 is restricted during the zoom operation. Therefore, it is possible to prevent imaging composition from being inconsistent with user intention such as the shift of a position of a main subject such as a face of a person before and after the zoom operation. Therefore, it is possible to always obtain the imaging composition consistent with the user intention in a case where the zoom operation is performed. In particular, since the shift operation in which the optical center OC and the image center IC are shifted is prohibited, it is possible to surely eliminate a possibility that the imaging composition may be inconsistent with the user intention.

On the other hand, since the optical center OC and the image center IC are not shifted in the rotation operation, the rotation operation is allowed regardless of whether the zoom operation is being performed or stopped. Even in the case, there is no possibility that the imaging composition may be inconsistent with the user intention. In addition, since the shake correction by the rotation operation is always performed, it is possible to maintain image quality of the captured image at a certain level.

In a case where the optical center OC and the image center IC are shifted due to the shift operation, the image sensor 19 is moved to the origin position where the optical center OC matches the image center IC and the operation prohibition is executed. Therefore, it is possible to perform the zoom operation in a state where the optical center OC surely matches the image center IC.

In a case where the zoom operation is being performed, not only the shift operation but also the rotation operation may be prohibited and restricted as in operation deciding result information C shown in FIG. 10. In the case where the zoom operation is being performed, only the roll operation among the rotation operations may be allowed, and the pitch operation and the yaw operation may be prohibited and restricted as in operation deciding result information D shown in FIG. 11. In other words, at least one of the plurality of types of sensor movement operations may be restricted. The image sensor 19 is moved to the origin position of a rotation angle and the operation prohibition is executed also for the rotation operation.

Further, a movable range of the shift operation in the case where the zoom operation is being performed may be restricted (range restriction) compared with a movable range while the zoom operation is stopped as in operation deciding result information E shown in FIG. 12. For example, a range in which the shift between the optical center OC and the image center IC is not so noticeable before and after the zoom operation is set as the movable range of the shift operation in the case where the zoom operation is being performed. For this reason, the movable range of the shift operation in the case where the zoom operation is being performed is a very narrow range compared with the movable range while the zoom operation is stopped.

In this manner, in a case where the shift operation is not completely prohibited in the case where the zoom operation is being performed and the shift operation is allowed even though the range is narrow, it is possible to contribute to improving the image quality of the captured image.

More specifically, the shift operation of the shake correction mechanism 65 is effective for, for example, the shake correction in an XY direction that is likely to occur at the time of macro imaging. However, in a case where the shift operation of the shake correction mechanism 65 is completely prohibited, the effective shake correction is not performed. Therefore, the image quality of the captured image may be significantly deteriorated. However, it is possible to eliminate such an adverse effect by allowing the shift operation as shown in FIG. 12.

Second Embodiment

In a second embodiment shown in FIGS. 13 to 20, a degree of restriction on the sensor movement operation is changed according to a focal length that changes with the zoom operation. In the following, a description of points that are common to the first embodiment will be omitted as appropriate, and differences from the first embodiment will be mainly described. The same applies to the following embodiments.

Figure 13:
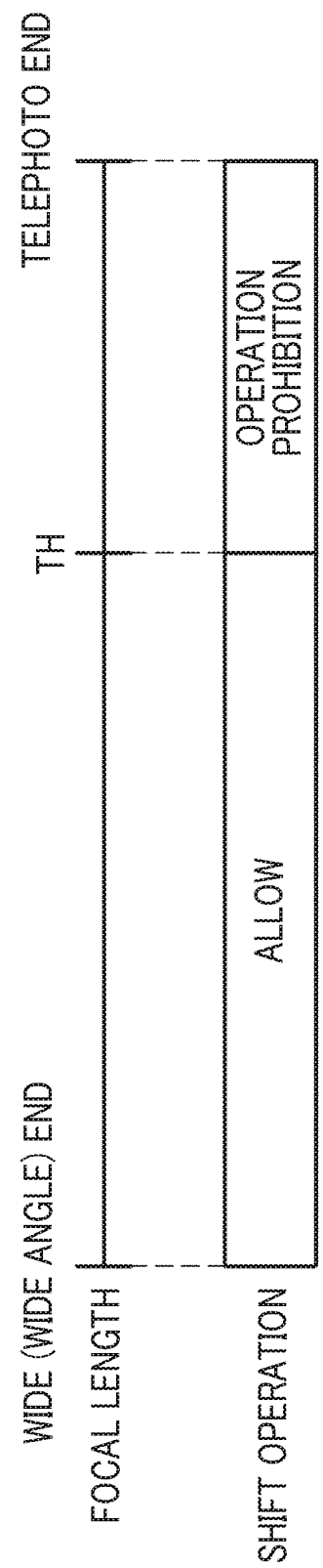
FIG. 13 is a diagram showing an example of prohibiting the shift operation according to a focal length.
Figure 14:
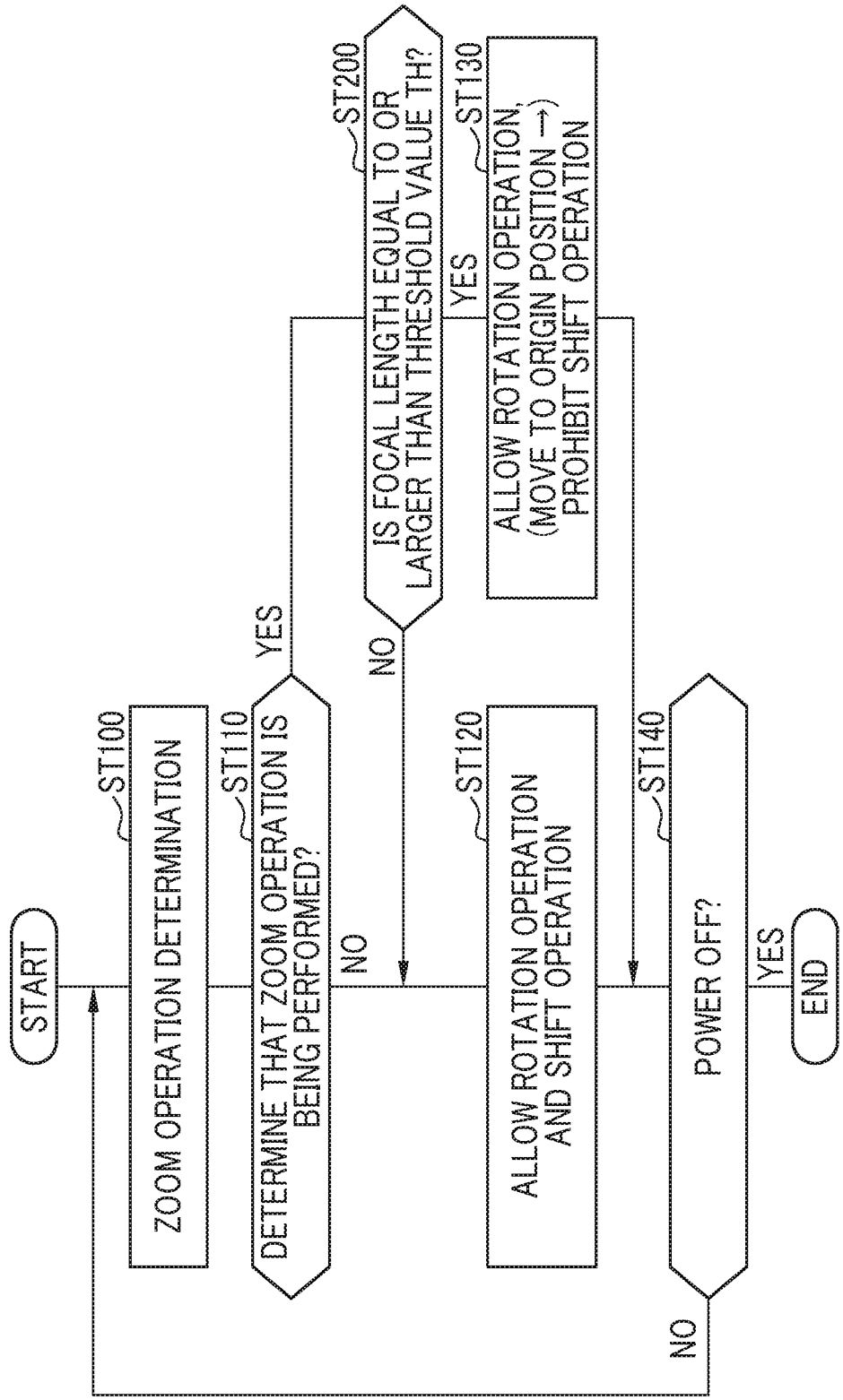
FIG. 14 is a flowchart showing a processing procedure of the example of prohibiting the shift operation according to the focal length.

FIGS. 13 and 14 are examples in a case where the shift operation is prohibited. In the case, the position of the zoom lens 45C on the optical axis OA is included in the zoom operation information. The zoom operation determination unit 95 calculates the focal length based on the position of the zoom lens 45C on the optical axis OA. In addition to determining whether or not the zoom operation is being performed, determination is made whether or not the focal length is equal to or larger than a preset threshold value TH. The operation deciding unit 96 executes the operation prohibition of the shift operation in a case where the focal length is equal to or larger than the threshold value TH and allows the shift operation in a case where the focal length is less than the threshold value TH.

Here, the focal length is minimum at a wide (wide angle) end and maximum at a telephoto end. For this reason, the focal length equal to or larger than the threshold value TH means that the focal length is the same as the threshold value TH or closer to the telephoto end side than the threshold value TH.

FIG. 14 is a flowchart showing a processing procedure of the camera 10 in the case of FIG. 13. In the first embodiment, in the case where the zoom operation determination unit 95 determines that the zoom operation is being performed (YES in step ST110), the shift operation is prohibited unconditionally. On the contrary, in the second embodiment, in a case where the zoom operation determination unit 95 determines that the zoom operation is being performed and the focal length is determined to be equal to or larger than the threshold value TH (YES in both steps ST110 and ST200), the operation deciding unit 96 prohibits the shift operation (step ST130, operation deciding step). On the contrary, in a case where the focal length is less than the threshold value TH (NO in step ST200), the operation deciding unit 96 allows the shift operation (step ST120, operation deciding step) as in the case where the zoom operation is determined to be stopped (NO in step ST110).

Figure 15:
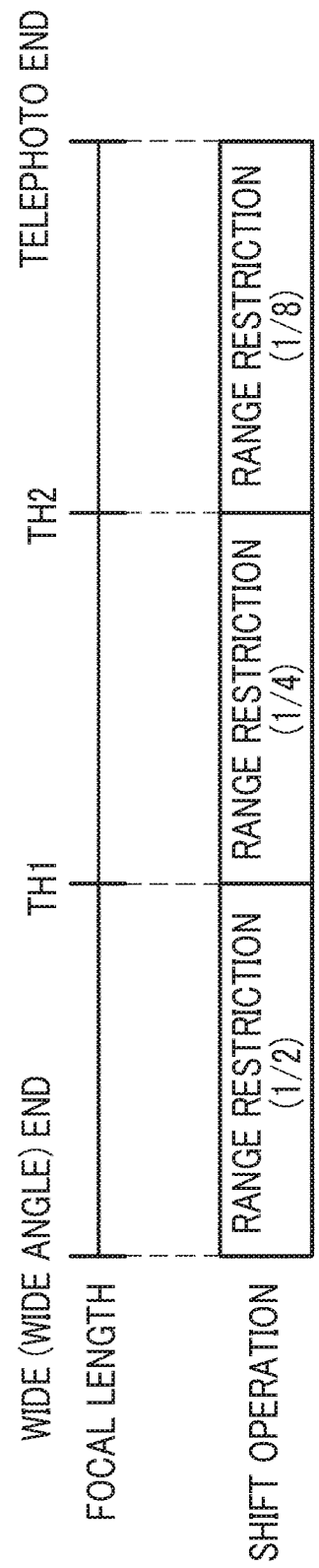
FIG. 15 is a diagram showing an example of changing a degree of range restriction on the shift operation according to the focal length.
Figure 16:
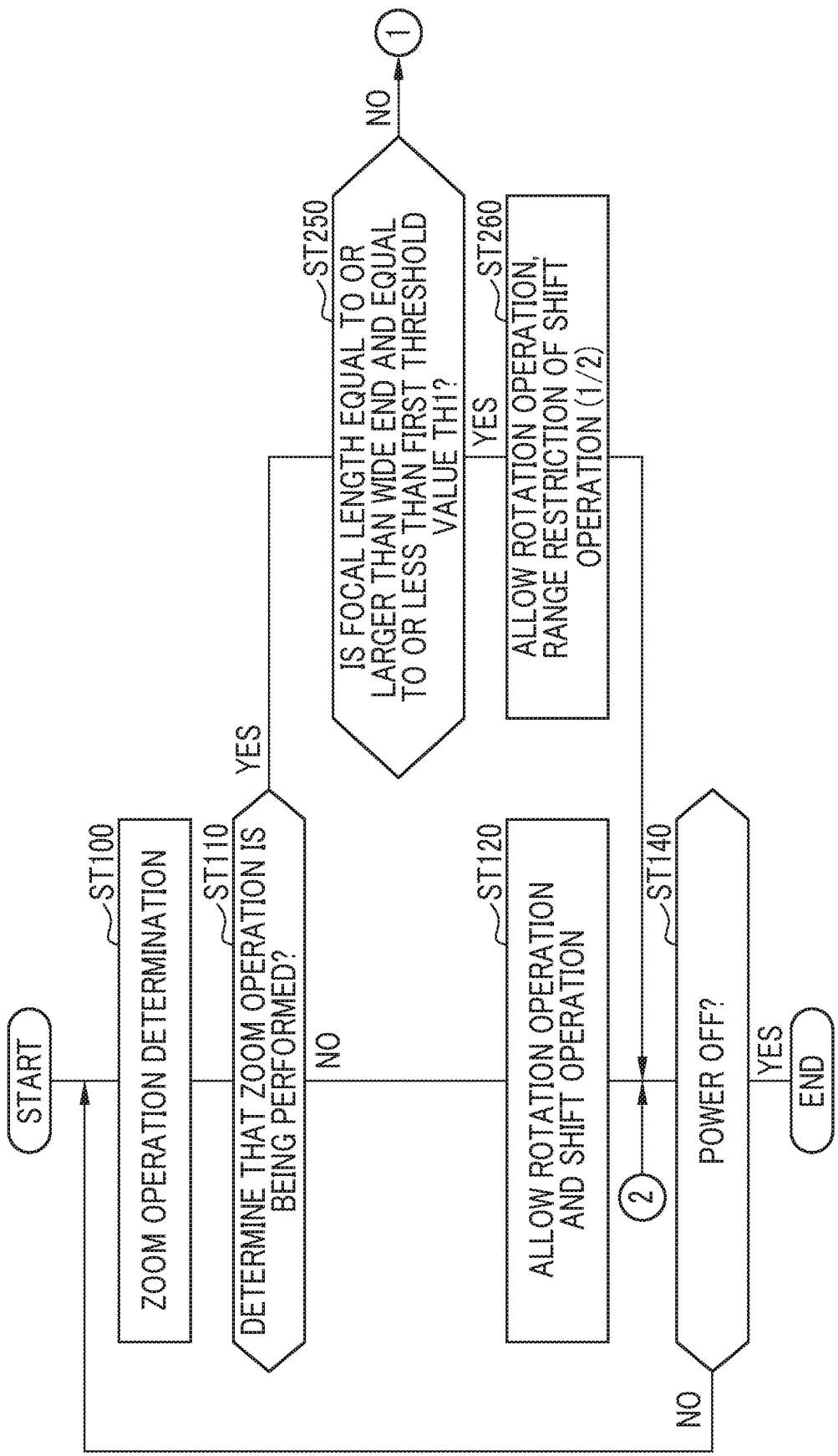
FIG. 16 is a flowchart showing a processing procedure of the example of changing the degree of range restriction on the shift operation according to the focal length.
Figure 17:
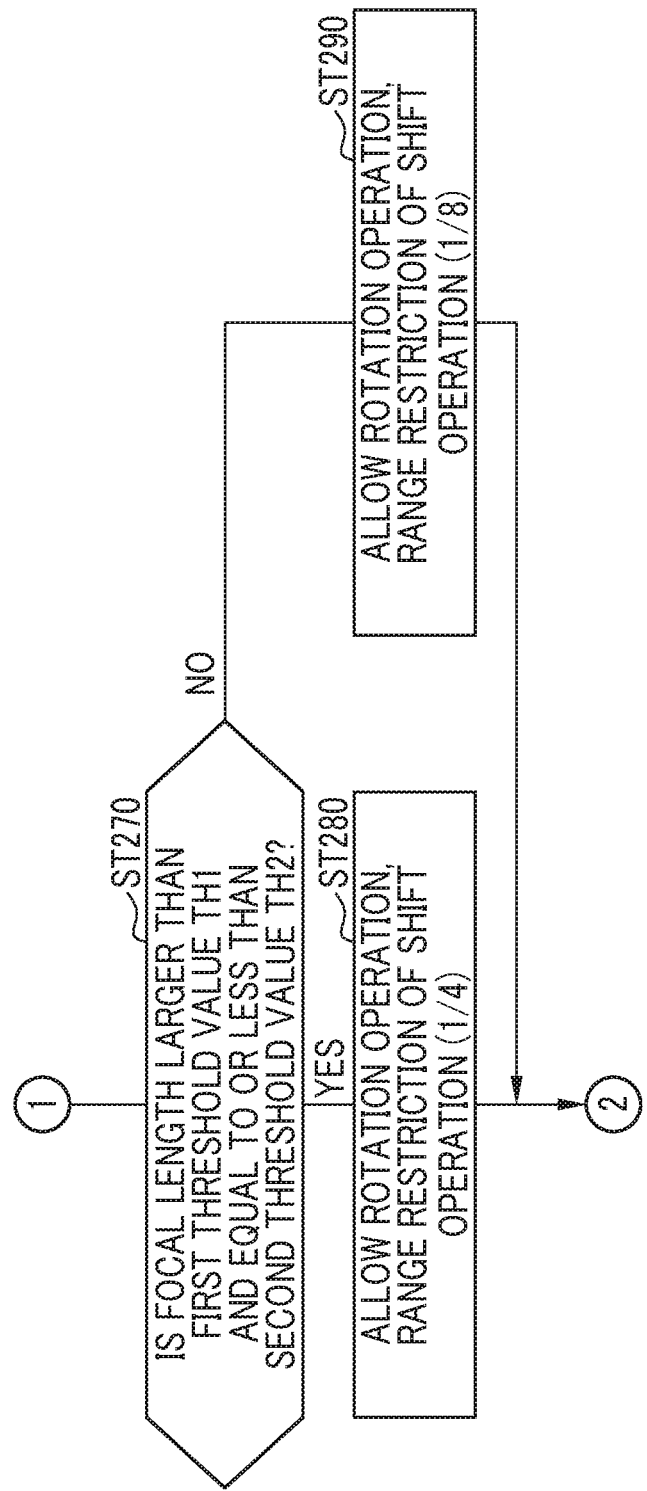
FIG. 17 is a flowchart showing a processing procedure of the example of changing the degree of range restriction on the shift operation according to the focal length.

FIGS. 15 to 17 are examples in the case of restricting the range of the shift operation. Also in the case, the zoom operation information includes the position of the zoom lens 45C on the optical axis OA, and the zoom operation determination unit 95 calculates the focal length based on the position of the zoom lens 45C on the optical axis OA as in the cases of FIGS. 13 and 14. The zoom operation determination unit 95 compares magnitude of the focal length with a first threshold value TH1 and a second threshold value TH2 (TH1<TH2) in addition to determining whether or not the zoom operation is being performed. In a case where the zoom operation determination unit 95 determines that the focal length is equal to or larger than the wide end and equal to or less than the first threshold value TH1, the operation deciding unit 96 restricts the range of the shift operation to ½ of the movable range while the zoom operation is stopped. In a case where determination is made that the focal length is larger than the first threshold value TH1 and equal to or less than the second threshold value TH2, the range of the shift operation is restricted to ¼ of the movable range while the zoom operation is stopped. In a case where determination is made that the focal length is larger than the second threshold value TH2 and equal to or less than the telephoto end, the range of the shift operation is restricted to ⅛ of the movable range while the zoom operation is stopped. That is, the movable range of the shift operation in the case where the focal length is long is restricted compared with the movable range in the case where the focal length is short.

FIGS. 16 and 17 are flowcharts showing a processing procedure of the camera 10 in the case of FIG. 15. That is, in a case where the zoom operation determination unit 95 determines that the zoom operation is being performed and the focal length is determined to be equal to or larger than the wide end and equal to or less than the first threshold value TH1 (YES in both steps ST110 and ST250), the operation deciding unit 96 restricts the range of the shift operation to ½ of the movable range while the zoom operation is stopped (step ST260, operation deciding step). On the contrary, in a case where the focal length is equal to or larger than the wide end and not equal to or less than the first threshold value TH1 (NO in step ST250), the processing proceeds to step ST270 in FIG. 17.

In FIG. 17, in a case where the zoom operation determination unit 95 determines that the focal length is larger than the first threshold value TH1 and equal to or less than the second threshold value TH2 (YES in step ST270), the operation deciding unit 96 restricts the range of the shift operation to ¼ of the movable range while the zoom operation is stopped (step ST280, operation deciding step). Further, in a case where the zoom operation determination unit 95 determines that the focal length is larger than the second threshold value TH2 and equal to or less than the telephoto end (NO in step ST270), the operation deciding unit 96 restricts the range of the shift operation to ⅛ of the movable range while the zoom operation is stopped (step ST290, operation deciding step).

As described above, the operation prohibition of the sensor movement operation (shift operation) is executed in a case where the focal length is equal to or larger than the threshold value TH, and the operation prohibition thereof is not executed in a case where the focal length is less than the threshold value TH. Alternatively, the movable range of the sensor movement operation (shift operation) in a case where the focal length is long is restricted compared with the movable range in a case where the focal length is short. Therefore, it is possible to enhance a probability that a main subject, which is a subject desired to be imaged mainly by the user, fits within the imaging composition.

Figure 18:
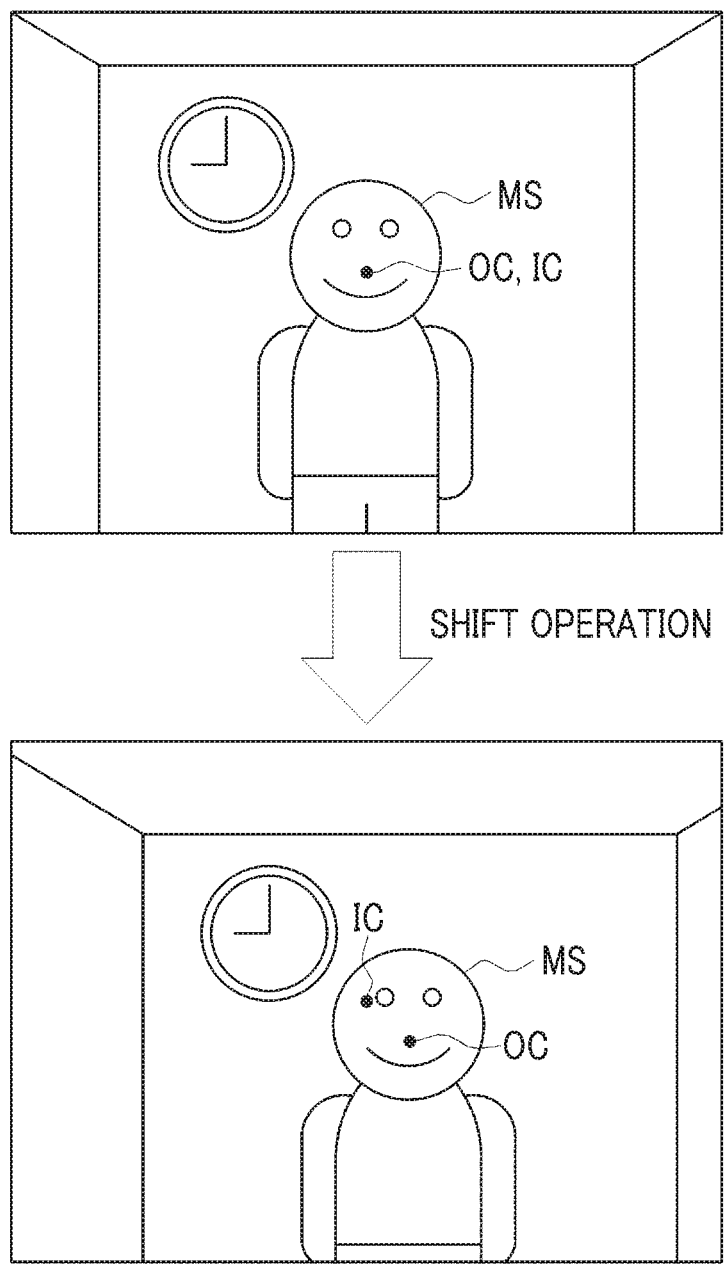
FIG. 18 is a diagram showing a case where the shift operation is performed in wide angle imaging

More specifically, in a case of wide angle imaging with a relatively short focal length, a face MS of the person who is the main subject appears relatively small as shown in FIG. 18. For this reason, even in a case where the optical center OC and the image center IC are shifted by the shift operation, the face MS is within the imaging composition as shown below an arrow.

Figure 19:
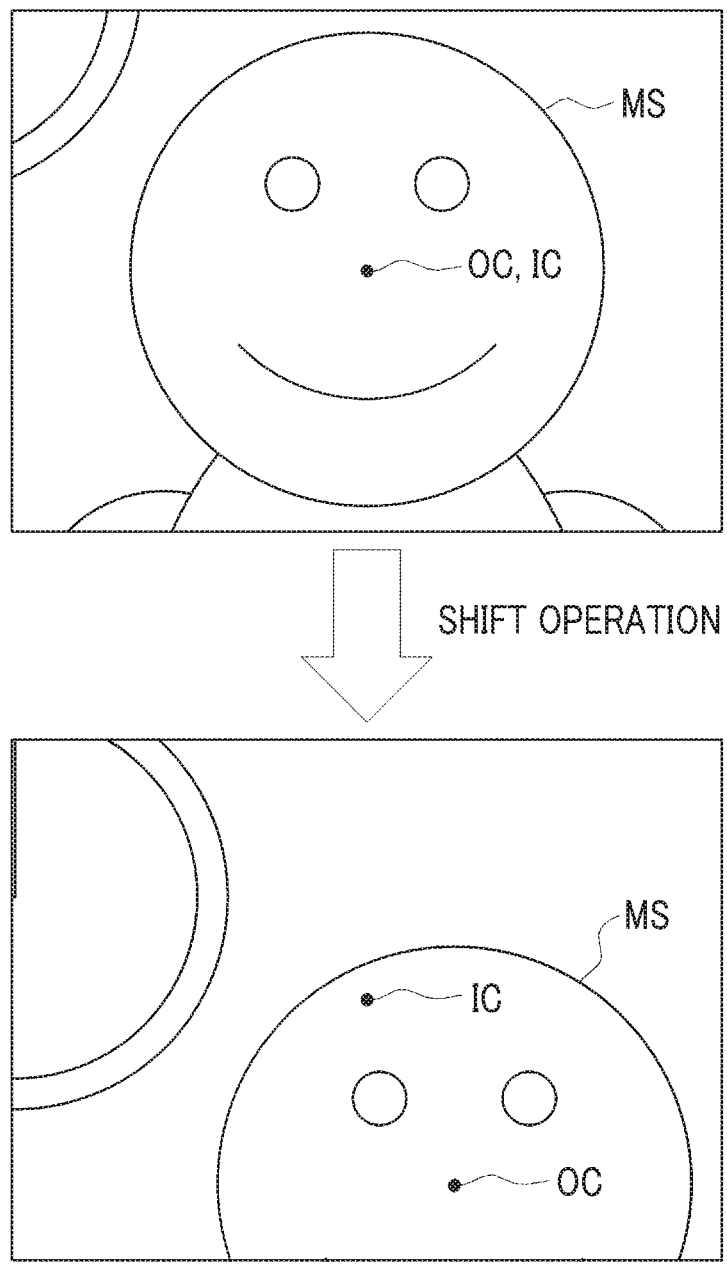
FIG. 19 is a diagram showing a case where the shift operation is performed in telephoto imaging.

On the contrary, in a case of telephoto imaging with a relatively long focal length, the face MS thereof appears relatively large as shown in FIG. 19. For this reason, in the case where the optical center OC and the image center IC are shifted by the shift operation, the face MS thereof is out of the imaging composition as shown below an arrow. That is, the telephoto imaging in FIG. 19 has a higher probability that the main subject is out of the imaging composition due to the shift operation than the wide angle imaging in FIG. 18.

In the second embodiment, the operation prohibition of the sensor movement operation (shift operation) is executed or the movable range of the sensor movement operation (shift operation) is restricted, in the case of telephoto imaging having the high probability that the main subject is out of the imaging composition due to the shift operation. With this, the probability that the main subject fits within the imaging composition increases, and thus it is possible to obtain the imaging composition consistent with the user intention more surely.

The range restriction stage is not restricted to the above three stages. Three or more threshold values may be set to restrict the range to four or more stages. Further, a degree of the range restriction is not restricted to the above-mentioned ½, ¼, and ⅛, and the setting can be changed as appropriate.

Figure 20:
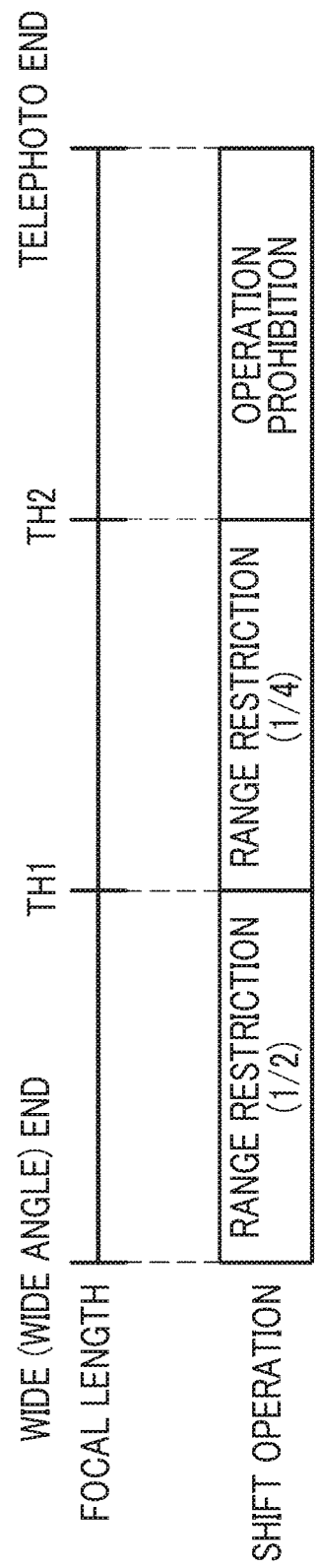
FIG. 20 is a diagram showing an example of changing the degree of range restriction on the shift operation according to the focal length and of prohibiting the shift operation.

The example of the case where the shift operation is prohibited as shown in FIGS. 13 and 14 may be performed by being combined with the example of the case where the range of the shift operation is restricted as shown in FIGS. 15 to 17. Specifically, in a case where the zoom operation determination unit 95 determines that the focal length is equal to or larger than the wide end and equal to or less than the first threshold value TH1, the operation deciding unit 96 restricts the range of the shift operation to ½ of the movable range while the zoom operation is stopped as shown in FIG. 20. In a case where determination is made that the focal length is larger than the first threshold value TH1 and equal to or less than the second threshold value TH2, the range of the shift operation is restricted to ¼ of the movable range while the zoom operation is stopped. In a case where determination is made that the focal length is larger than the second threshold value TH2 and equal to or less than the telephoto end, the operation prohibition of the shift operation is executed. The same effect as described above can also be obtained by the example of FIG. 20.

Third Embodiment

In a third embodiment shown in FIGS. 21 to 24, in a case where a lens unit having a lens movement type shake correction mechanism is mounted on the mount portion, the sensor movement operation in which a sensor movement type shake correction mechanism 65 moves the image sensor 19 to the origin position is canceled by a lens movement type shake correction mechanism.

Figure 21:
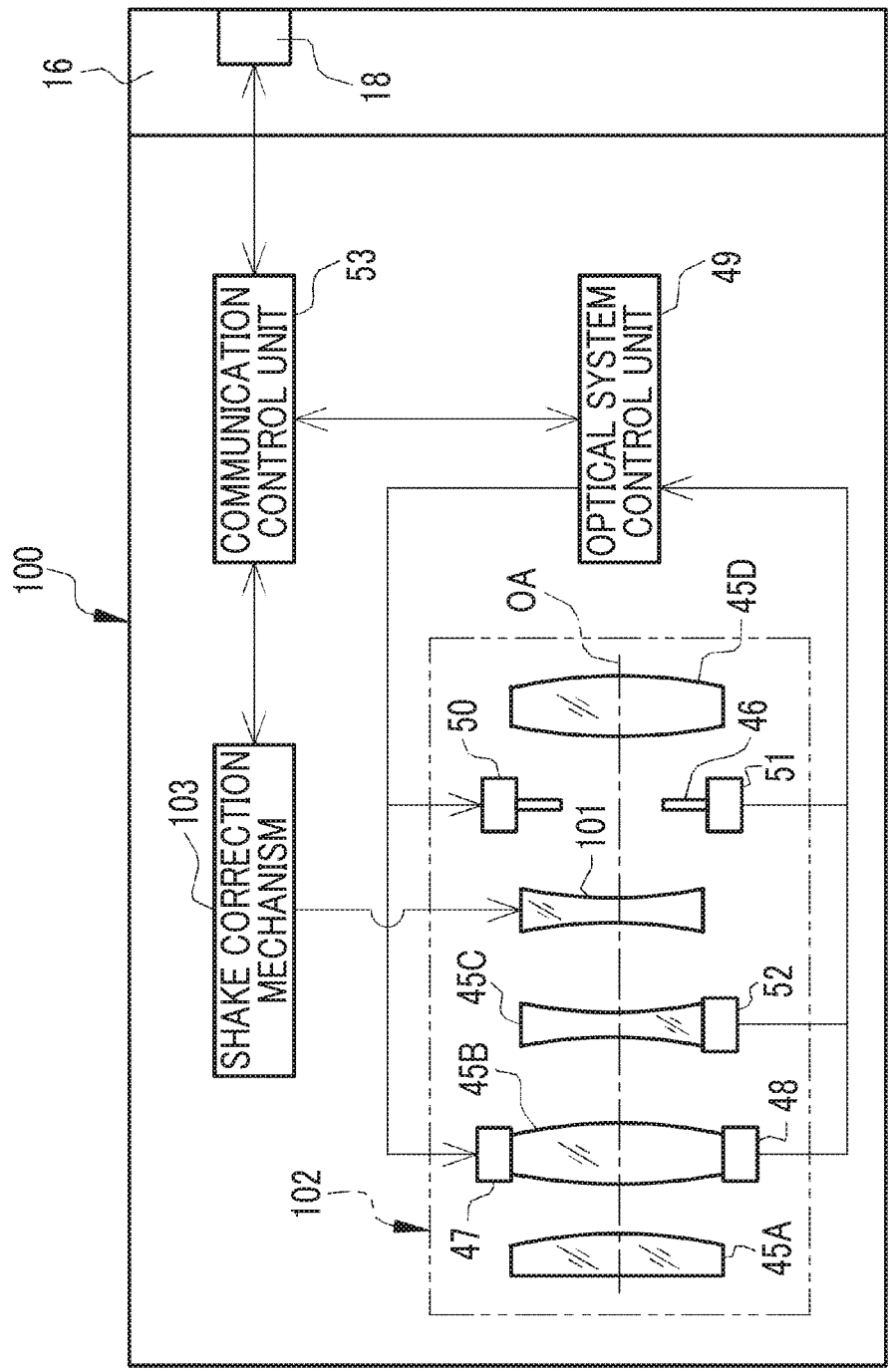
FIG. 21 is a block diagram of a lens unit having a lens movement type shake correction mechanism.

A lens unit 100 shown in FIG. 21 has an imaging optical system 102 including a correction lens 101 in addition to the lenses 45A to 45D and the stop mechanism 46 according to the first embodiment. The lens unit 100 has a lens movement type shake correction mechanism 103 that performs a lens movement operation of moving the correction lens 101 in a direction to cancel out the shake. The communication control unit 53 is connected to the shake correction mechanism 103. The shake correction mechanism 103 exchanges various types of information with the camera 10 through the communication control unit 53.

Figure 22:
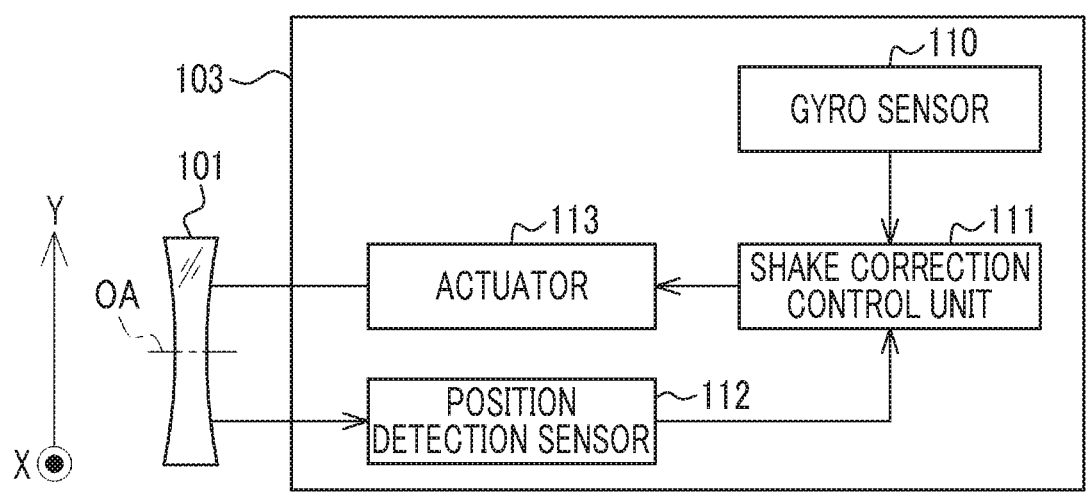
FIG. 22 is a diagram showing details of the lens movement type shake correction mechanism.

As shown in FIG. 22, the lens movement type shake correction mechanism 103 basically comprises the same configuration as the sensor movement type shake correction mechanism 65 shown in FIG. 6 and includes a gyro sensor 110, a shake correction control unit 111, a position detection sensor 112, and an actuator 113. The shake correction mechanism 103 operates independently of the shake correction mechanism 65.

The shake correction mechanism 103 performs only a shift operation of moving the correction lens 101 parallel to the XY plane perpendicular to the optical axis OA as the lens movement operation and does not perform the rotation operation. Further, the shake correction mechanism 103 aligns the optical center OC with the image center IC by the lens movement operation. For this reason, the optical center OC always matches the image center IC in the lens movement operation. Therefore, the shake correction mechanism 103 always performs the lens movement operation regardless of whether the zoom operation is being performed or stopped.

Figure 23:
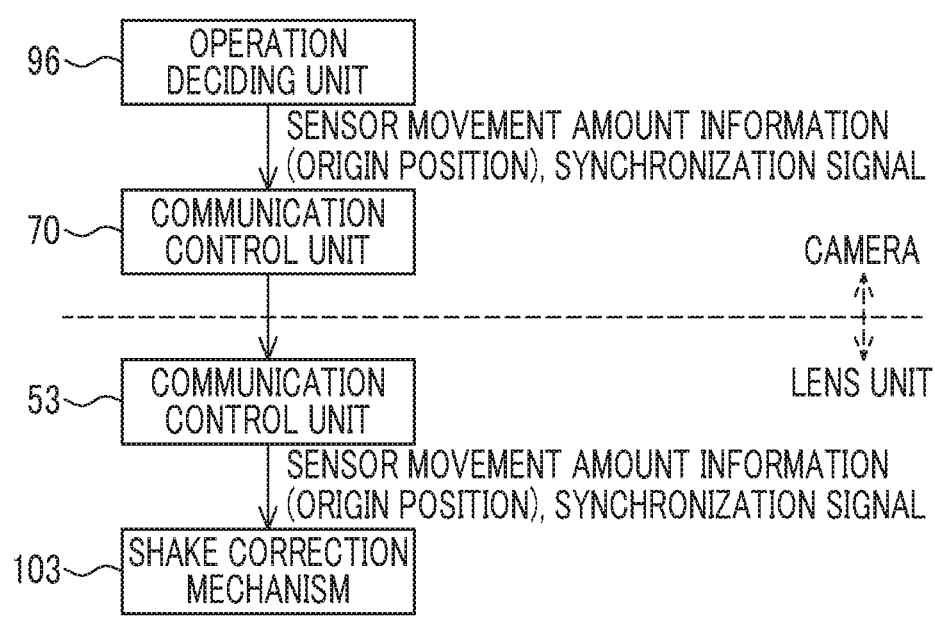
FIG. 23 is a diagram showing a flow of information from an operation deciding unit to the lens movement type shake correction mechanism.

As shown in FIG. 23, in a case where the lens unit 100 is mounted on the mount portion 15, the operation deciding unit 96 outputs sensor movement amount information and a synchronization signal in a case where the sensor movement type shake correction mechanism 65 moves the image sensor 19 to the origin position by the sensor movement operation. The sensor movement amount information is information indicating the movement amount of the image sensor 19 to the origin position by the sensor movement operation. The synchronization signal is a signal for synchronizing the sensor movement operation of moving the image sensor 19 to the origin position and the lens movement operation of canceling the sensor movement operation. The synchronization signal is, for example, a timepoint when the sensor movement operation of moving the image sensor 19 to the origin position is scheduled.

The operation deciding unit 96 outputs the sensor movement amount information and the synchronization signal to the communication control unit 70 of the camera 10. The communication control unit 70 transmits the sensor movement amount information and the synchronization signal to the communication control unit 53 of the lens unit 100. The communication control unit 53 outputs the sensor movement amount information and the synchronization signal to the lens movement type shake correction mechanism 103.

Figure 24:
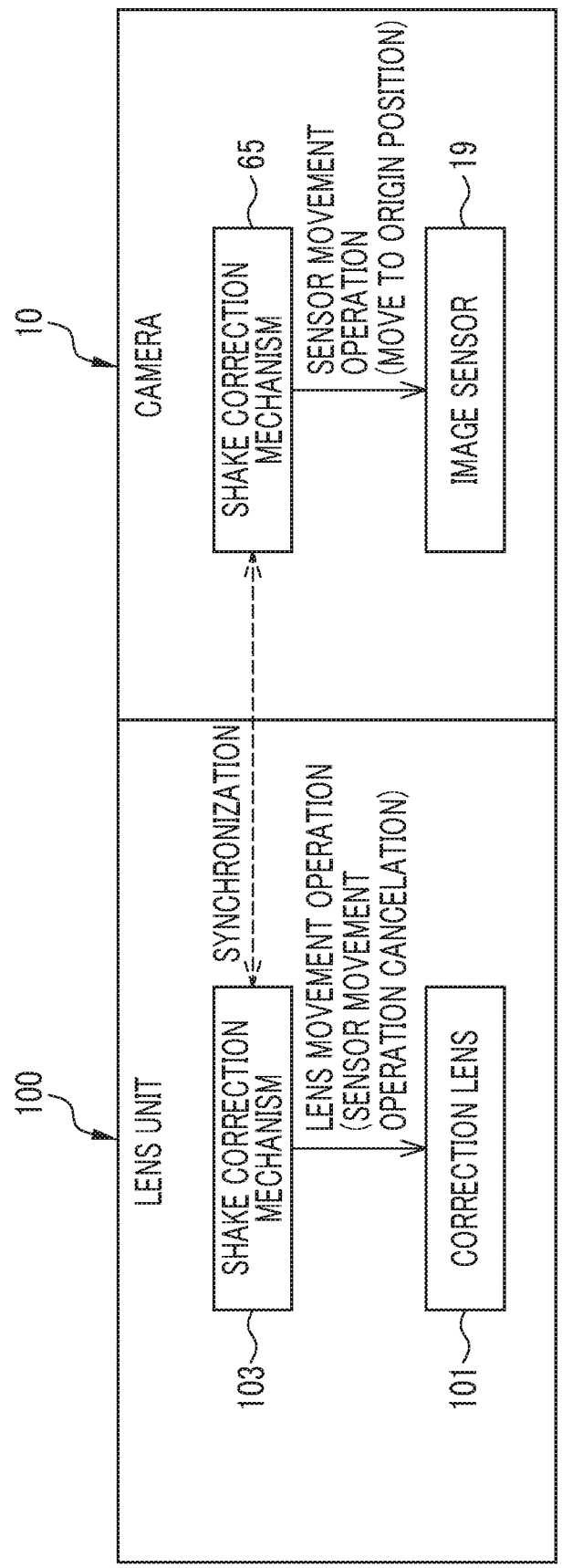
FIG. 24 is a diagram showing a state in which the sensor movement operation of moving an image sensor to an origin position by a sensor movement type shake correction mechanism is canceled by the lens movement type shake correction mechanism.

As shown in FIG. 24, the shake correction mechanism 103 of the lens unit 100 performs the lens movement operation of canceling the sensor movement operation in synchronization with the sensor movement operation of the sensor movement type shake correction mechanism 65 that moves the image sensor 19 to the origin position based on the sensor movement amount information and the synchronization signal.

In this manner, the lens movement type shake correction mechanism 103 performs the lens movement operation of canceling the sensor movement operation of the sensor movement type shake correction mechanism 65 that moves the image sensor 19 to the origin position. Therefore, it is possible to eliminate the shake of the captured image due to the sensor movement operation of moving the image sensor 19 to the origin position. Therefore, there is no possibility that the user feels uncomfortable in a case where the captured image is viewed in live view display.

Fourth Embodiment

Figure 25:
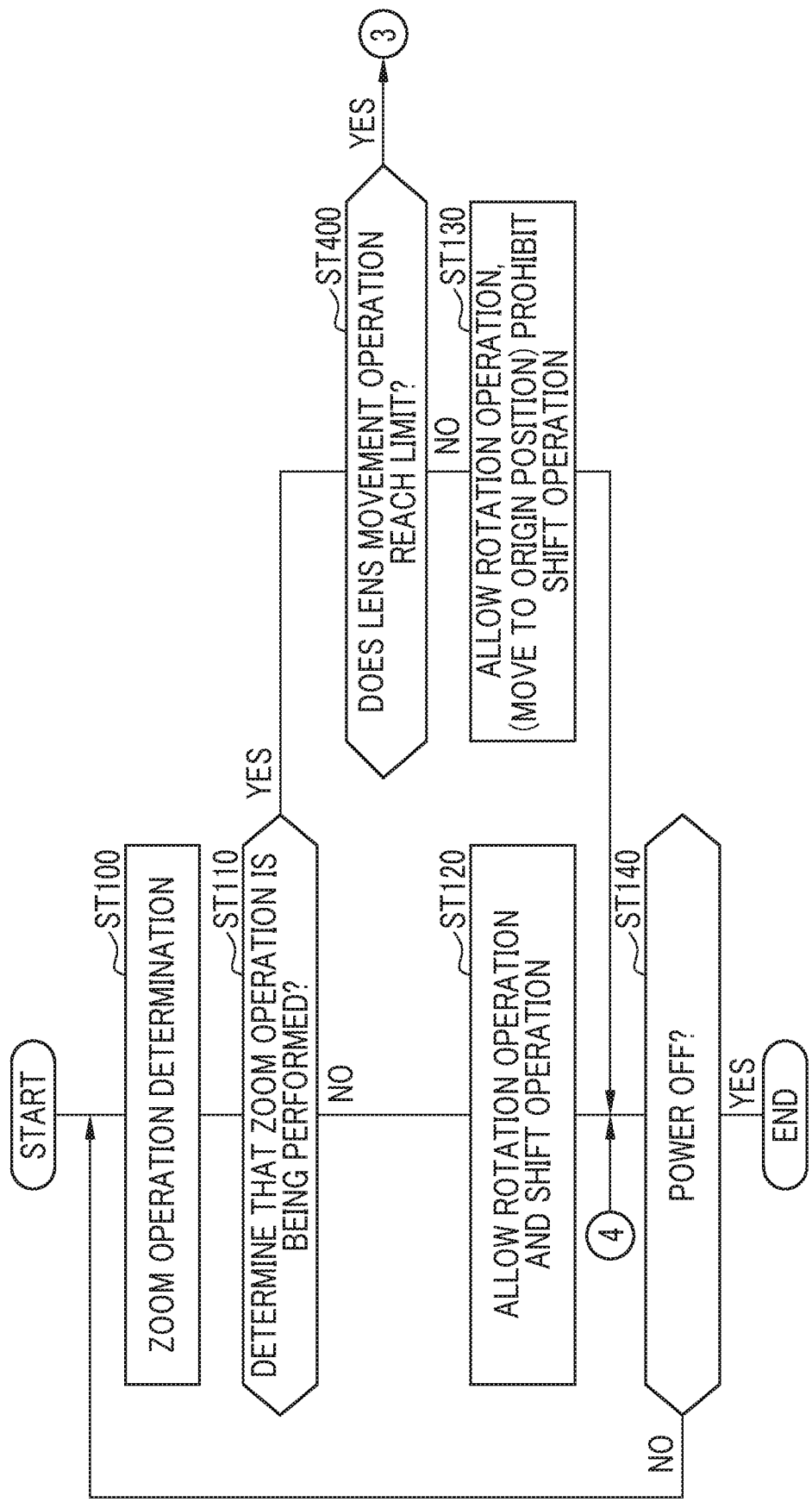
FIG. 25 is a flowchart showing a processing procedure of the lens interchangeable digital camera according to a fourth embodiment.
Figure 26:
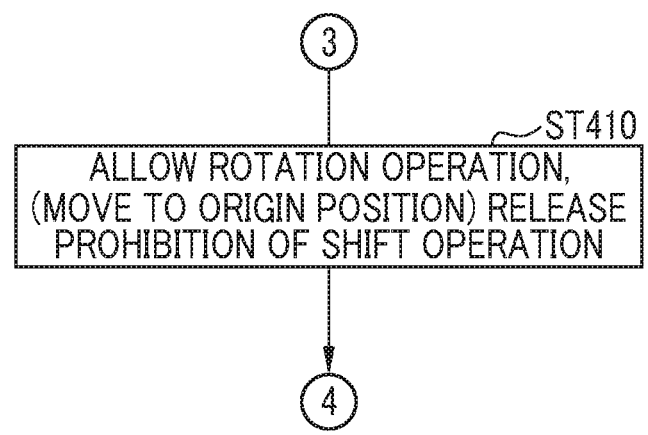
FIG. 26 is a flowchart showing a processing procedure of the lens interchangeable digital camera according to the fourth embodiment.

In a fourth embodiment shown in FIGS. 25 and 26, in the case where the lens unit 100 is mounted on the mount portion 15, in a case where the correction lens 101 reaches an end of the movable range while the zoom operation is performed and the cancellation of shake in the lens movement operation reaches a limit, the restriction on the sensor movement operation is released.

In the fourth embodiment, the lens movement type shake correction mechanism 103 outputs a position detection result of the correction lens 101 by the position detection sensor 112 to the communication control unit 53. The position detection result of the correction lens 101 is transmitted from the communication control unit 53 to the communication control unit 70 of the camera 10 and is further output from the communication control unit 70 to the zoom operation determination unit 95.

The zoom operation determination unit 95 determines whether or not the correction lens 101 reaches the end of the movable range and the cancellation of shake in the lens movement operation reaches the limit based on the position detection result of the correction lens 101. The movable range of the correction lens 101 is, for example, transmitted from the lens unit 100 in a case where the lens unit 100 is mounted and stored in the storage unit 74.

In a case where the zoom operation determination unit 95 determines that the cancellation of the shake in the lens movement operation reaches the limit, the operation deciding unit 96 releases the restriction on the sensor movement operation of the sensor movement type shake correction mechanism 65.

FIGS. 25 and 26 are flowcharts showing a processing procedure of the camera 10 according to the fourth embodiment. In a case where the zoom operation determination unit 95 determines that the zoom operation is being performed and the cancellation of the shake in the lens movement operation does not reach the limit (YES in step ST110 and NO in step ST400), the operation deciding unit 96 prohibits the shift operation of the sensor movement type shake correction mechanism 65 (step ST130, operation deciding step) as in the case where determination is made that the zoom operation is being performed in the first embodiment.

On the other hand, in a case where determination is made that the cancellation of the shake in the lens movement operation reaches the limit (YES in step ST400), the operation deciding unit 96 releases the prohibition of the shift operation of the sensor movement type shake correction mechanism 65 as shown in FIG. 26 (step ST410, operation deciding step). In the case, in a case where the optical center OC and the image center IC are shifted due to the shift operation, the image sensor 19 is moved to the origin position where the optical center OC matches the image center IC.

The case where the correction lens 101 reaches the end of the movable range and the cancellation of shake in the lens movement operation reaches the limit is a state where a considerable amount of shake occurs. In the state, suppression of the deterioration in the image quality of the captured image due to the shake is first decided rather than the shift of the imaging composition while the zoom operation is performed caused by the shift between the optical center OC and the image center IC. In the fourth embodiment, in the case where the cancellation of the shake in the lens movement operation reaches the limit, the restriction on the sensor movement operation is released even while the zoom operation is performed. With this, it is possible to suppress the deterioration in the image quality of the captured image due to the shake. Since the image sensor 19 always moves from the origin position, it is possible to minimize the shift between the optical center OC and the image center IC.

In each of the embodiments described above, for example, hardware structures of the processing units, such as the zoom operation determination unit 95 and the operation deciding unit 96, that execute various pieces of processing are various processors as shown below.

The various processors include a CPU, a programmable logic device (PLD), a dedicated circuitry, and the like. The CPU is a general-purpose processor that executes software (program) to function as various processing units as well known. The PLD is a processor whose circuit configuration can be changed after manufacturing, such as a field programmable gate array (FPGA). The dedicated circuitry is a processor having a circuit configuration designed specially for executing specific processing, such as an application specific integrated circuit (ASIC).

One processing unit may be composed of one of these various processors or a combination of two or more processors having the same type or different types (for example, combination of a plurality of FPGAs, or a CPU and an FPGA). A plurality of processing units may be composed of one processor. As an example of composing the plurality of processing units with one processor, first, there is a form in which one processor is composed of a combination of one or more CPUs and software and the processor functions as the plurality of processing units. Second, there is a form of using a processor realizing the functions of the entire system including the plurality of processing units with one IC chip, as represented by a system on chip (SoC) or the like. As described above, the various processing units are composed of one or more of the various processors described above as the hardware structure.

Further, the hardware structure of these various processors is, more specifically, a circuitry combining circuit elements such as a semiconductor element.

From the above description, it is possible to grasp the imaging device described in the following additional item 1.

[Additional Item 1]

In an imaging device including an image sensor in which a subject image is formed on an imaging surface through an imaging optical system including a zoom lens and a sensor movement type shake correction mechanism that performs a sensor movement operation of moving the image sensor in a direction to cancel a shake, the imaging device comprises a zoom operation determination processor that determines whether or not a zoom operation in which the zoom lens moves is being performed, and an operation deciding processor that decides an operation of the shake correction mechanism according to a determination result of the zoom operation determination processor, in which the operation deciding processor restricts at least a part of the sensor movement operation which is allowed while the zoom operation is stopped in a case where determination is made by the zoom operation determination processor that the zoom operation is being performed.

In each of the embodiments described above, the lens interchangeable digital camera 10 is exemplified as the imaging device, but the present invention is not limited thereto. The present invention is also adaptable to a digital camera in which a lens portion is provided integrally with a camera body. The invention is also adaptable to a video camera, a mobile phone with a camera, or the like.

Needless to say, the present invention is not limited to each embodiment described above, and various configurations may be employed without departing from the gist of the invention.

EXPLANATION OF REFERENCES

10: lens interchangeable digital camera (camera)
11, 100: lens unit
15: mount portion
16: engaging portion
17, 18: signal contact
19: image sensor
20: imaging surface
21: power lever
22: release switch
23: exposure correction dial
24: shutter speed/ISO sensitivity dial
25: hot shoe
27: display unit
28: optical viewfinder
29: operation key group
30: lid
35, 102: imaging optical system
36: focus ring
37: zoom ring
38: iris ring
45A, 45D: lens
45B: focus lens
45C: zoom lens
46: stop mechanism
47, 50: actuator
48, 52: position detection sensor
49: optical system control unit
51: opening detection sensor
53: communication control unit
65: shake correction mechanism (sensor movement type shake correction mechanism)
66: analog front end (AFE)
67: digital signal processor (DSP)
68: sensor control unit
69: central processing unit (CPU)
70: communication control unit
71: frame memory
72: display control unit
73: card control unit
74: storage unit
75: data bus
76: operation program
77: memory card
85, 110: gyro sensor
86, 111: shake correction control unit
87, 112: position detection sensor
88, 113: actuator
95: zoom operation determination unit
96: operation deciding unit
101: correction lens
103: shake correction mechanism (lens movement type shake correction mechanism)
OA: optical axis
OC: optical center
IC: image center
X: axis along long side of imaging surface
Y: axis along short side of imaging surface
RO: arrow indicating roll operation
PI: arrow indicating pitch operation
YA: arrow indicating yaw operation
ST100 to ST140, ST200, ST250 to ST290, ST400, ST410: step
MS: face of person (main subject)

What is claimed is:

1. An imaging device comprising:
an image sensor in which a subject image is formed on an imaging surface through an imaging optical system including a zoom lens;

a sensor movement type shake correction mechanism that performs a sensor movement operation of moving the image sensor in a direction to cancel a shake; and
a processor configured to:
  determine whether or not a zoom operation in which the zoom lens moves is being performed; and
  decide an operation of the shake correction mechanism and restricts, when the shake correction mechanism is active, at least a part of the sensor movement operation which is allowed while the zoom operation is stopped in a case where it is determined that the zoom operation is being performed, wherein
the sensor movement operation includes a plurality of types of sensor movement operations having different movement directions of the image sensor, and the processor restricts at least one of the plurality of types of sensor movement operations,
the plurality of types of sensor movement operations include a rotation operation of rotationally moving the image sensor in a state where an optical center which is a point through which an optical axis of the imaging optical system passes matches an image center which is a center point of the imaging surface and a shift operation of moving the image sensor in parallel with a plane perpendicular to the optical axis, and the processor restricts at least the shift operation in a case where it is determined that the zoom operation is being performed, and
the processor allows the rotation operation regardless of whether the zoom operation is being performed or stopped.

2. The imaging device according to claim 1, wherein
the processor changes a degree of the restriction according to a focal length that changes with the zoom operation.

3. The imaging device according to claim 1, wherein
the restriction executed by the processor while the zoom operation is performed includes an operation prohibition for prohibiting the sensor movement operation, and
in the case where it is determined that the zoom operation is being performed while the sensor movement type shake correction mechanism is operated, the processor moves the image sensor to an origin position and then executes the operation prohibition.

4. The imaging device according to claim 3, wherein
the processor changes a degree of the restriction according to a focal length that changes with the zoom operation, and
the processor executes the operation prohibition in a case where the focal length is equal to or larger than a preset threshold value and does not execute the operation prohibition in a case where the focal length is less than the threshold value.

5. The imaging device according to claim 1, wherein
the restriction executed by the processor while the zoom operation is performed includes a range restriction that restricts a movable range of the image sensor compared with the movable range while the zoom operation is stopped.

6. The imaging device according to claim 5, wherein
the processor changes a degree of the restriction according to a focal length that changes with the zoom operation, and
the processor restricts the movable range in a case where the focal length is long compared with the movable range in a case where the focal length is short.

7. The imaging device according to claim 1, further comprising:
a mount portion on which a plurality of types of lens units are interchangeably mounted.

8. The imaging device according to claim 7, wherein
the restriction executed by the processor while the zoom operation is performed includes an operation prohibition for prohibiting the sensor movement operation,
in the case where it is determined that the zoom operation is being performed while the sensor movement type shake correction mechanism is operated, the processor moves the image sensor to an origin position and then executes the operation prohibition, and
in a case where the lens unit having a lens movement type shake correction mechanism that performs a lens movement operation of moving a correction lens which is a part of a plurality of lenses constituting the imaging optical system in a direction to cancel the shake is mounted on the mount portion, the processor causes the lens movement type shake correction mechanism to perform the lens movement operation of canceling the sensor movement operation of moving the image sensor to the origin position.

9. The imaging device according to claim 7, wherein
in the case where the lens unit having a lens movement type shake correction mechanism that performs a lens movement operation of moving a correction lens which is a part of a plurality of lenses constituting the imaging optical system in a direction to cancel the shake is mounted on the mount portion, the processor releases the restriction of the sensor movement operation in a case where the correction lens reaches an end of a movable range and the cancellation of the shake in the lens movement operation reaches a limit while the zoom operation is performed.

10. An operation method of an imaging device including an image sensor in which a subject image is formed on an imaging surface through an imaging optical system including a zoom lens and a sensor movement type shake correction mechanism that performs a sensor movement operation of moving the image sensor in a direction to cancel a shake, the method comprising:
  a zoom operation determination step of determining whether or not a zoom operation in which the zoom lens moves is being performed; and
  an operation deciding step of deciding an operation of the shake correction mechanism and restricting, when the shake correction mechanism is active, at least a part of the sensor movement operation which is allowed while the zoom operation is stopped in a case where determination is made in the zoom operation determination step that the zoom operation is being performed, wherein
the sensor movement operation includes a plurality of types of sensor movement operations having different movement directions of the image sensor, and at least one of the plurality of types of sensor movement operations is restricted,
the plurality of types of sensor movement operations include a rotation operation of rotationally moving the image sensor in a state where an optical center which is a point through which an optical axis of the imaging optical system passes matches an image center which is a center point of the imaging surface and a shift operation of moving the image sensor in parallel with a plane perpendicular to the optical axis, and, in a case where it is determined that the zoom operation is being performed, at least the shift operation is restricted, and the rotation operation is allowed regardless of whether the zoom operation is being performed or stopped.

11. A non-transitory computer readable medium for storing a computer-executable program for an imaging device including an image sensor in which a subject image is formed on an imaging surface through an imaging optical system including a zoom lens and a sensor movement type shake correction mechanism that performs a sensor movement operation of moving the image sensor in a direction to cancel a shake, the computer-executable program causing a computer to execute:
- a zoom operation determination function of determining whether or not a zoom operation in which the zoom lens moves is being performed; and
- an operation deciding function of deciding an operation of the shake correction mechanism and restricting, when the shake correction mechanism is active, at least a part of the sensor movement operation which is allowed while the zoom operation is stopped in a case where determination is made by the zoom operation determination function that the zoom operation is being performed, wherein the sensor movement operation includes a plurality of types of sensor movement operations having different movement directions of the image sensor, and at least one of the plurality of types of sensor movement operations is restricted, the plurality of types of sensor movement operations include a rotation operation of rotationally moving the image sensor in a state where an optical center which is a point through which an optical axis of the imaging optical system passes matches an image center which is a center point of the imaging surface and a shift operation of moving the image sensor in parallel with a plane perpendicular to the optical axis, and, in a case where it is determined that the zoom operation is being performed, at least the shift operation is restricted, and the rotation operation is allowed regardless of whether the zoom operation is being performed or stopped.

* * * * *